(12) United States Patent
Caneba

(10) Patent No.: US 7,691,260 B2
(45) Date of Patent: Apr. 6, 2010

(54) MULTIFUNCTIONAL MULTIPOLYMERIC SURFACTANTS FOR OIL AND BITUMEN RECOVERY AND OTHER APPLICATIONS

(75) Inventor: Gerard Caneba, Houghton, MI (US)

(73) Assignee: Nanochemical Oil Company, Houghton, MI (US)

( * ) Notice: Subject to any disclaimer, the term of this patent is extended or adjusted under 35 U.S.C. 154(b) by 382 days.

(21) Appl. No.: 11/673,364

(22) Filed: Feb. 9, 2007

(65) Prior Publication Data
US 2008/0190814 A1 Aug. 14, 2008

Related U.S. Application Data

(60) Provisional application No. 60/772,358, filed on Feb. 9, 2006.

(51) Int. Cl.
*C10G 1/04* (2006.01)
(52) U.S. Cl. .......................... 208/390; 526/79; 526/86; 526/87; 526/209; 526/317.1; 526/318.4; 526/318.6
(58) Field of Classification Search .................. 526/72, 526/79, 86, 87, 209, 317.1, 318.4, 318.6; 208/390
See application file for complete search history.

(56) References Cited

U.S. PATENT DOCUMENTS

| | | | | |
|---|---|---|---|---|
| 4,004,638 A | * | 1/1977 | Burdyn et al. | 166/270.1 |
| 4,008,767 A | * | 2/1977 | Waite | 166/400 |
| 4,100,966 A | | 7/1978 | Bousaid | |
| 4,589,488 A | * | 5/1986 | Schirmer | 166/257 |
| 4,645,589 A | | 2/1987 | Krambeck et al. | |
| 5,021,526 A | * | 6/1991 | Ball | 526/240 |
| 5,173,551 A | | 12/1992 | Caneba | |
| 5,252,138 A | | 10/1993 | Guymon | |
| 5,401,425 A | * | 3/1995 | Prukop | 507/200 |
| 5,753,127 A | * | 5/1998 | Riley | 210/749 |
| 7,125,825 B2 | | 10/2006 | Moss | |
| 2003/0153708 A1 | | 8/2003 | Caneba et al. | |
| 2005/0161372 A1 | | 7/2005 | Colic | |
| 2005/0199395 A1 | | 9/2005 | Berger | |

OTHER PUBLICATIONS

Griffin, W.C. (1949). J. Soc. Cosmet. Chem., 1, 311-326.*
International Search Report for PCT/US2007/003619 dated Dec. 5, 2007.
Caneba, et al., "Vinyl Acetate-Acrylic Acid Copolymer for Enhanced Oil Recovery," Journal of Minerals & Materials Characterization & Engineering, vol. 1, No. 2, 2002, pp. 97-109.
Gerard T. Caneba and Jay Axland Vinyl Acetate-Acrylic Acid Copolymer for Enhanced Oil Recovery.
Journal of Minerals and Materials Characterization and Engineering, vol. 1, No. 2 pp. 97-109 (200), USA.

* cited by examiner

*Primary Examiner*—Robert J Hill, Jr.
*Assistant Examiner*—Brian McCaig

(57) ABSTRACT

The present invention provides method for recovering fossil-based materials from oil sources using multifunctional, multipolymeric continuous composition spectrum surfactant mixtures. The invention also provides methods for reducing the loss of volatile organic compounds (VOCs) from oil storage containers using multifunctional, multipolymer surfactants. The multifunctional, multipolymer surfactants are characterized by a hydrophobic part and a hydrophilic part. The hydrophobic part of the polymer surfactants includes functionalities that impart a polarity of greater than 0 Debye to the hydrophobic part. The polymer surfactants are further characterized by molecular weights that are above their entanglement weights. The result is polymer surfactants and their continuous composition surfactant-thickener mixtures with demulsifying characteristics.

20 Claims, 15 Drawing Sheets

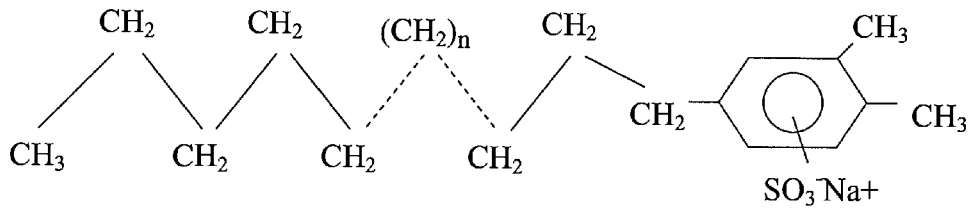
SODIUM ALKYL-ORTHOXYLENE SULFONATE
(n = from 2 to 10)
FIG. 1-A
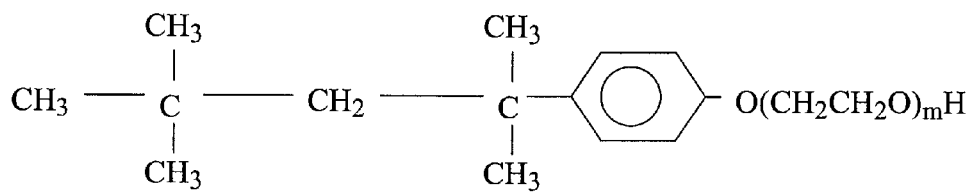
ETHOXYLATED OCTYLPHENOL (NONIONIC)
(m = from 2 to 100 – average value)
FIG. 1-B
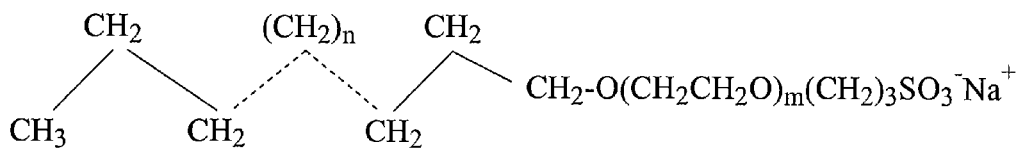
ETHOXYLATED SULFONATE
(OR ALCOHOL ETHER SULFONATE)
FIG. 1-C $C_S$ – CONCENTRATION OF SURFACTANT

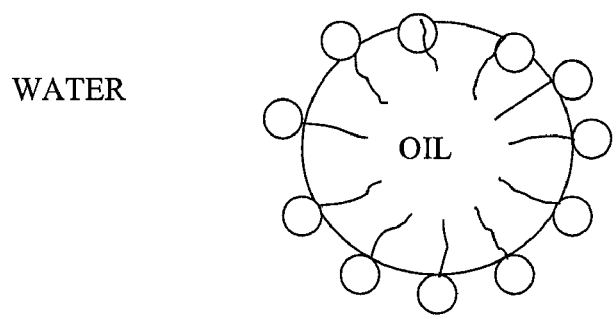
FIG. 5-A
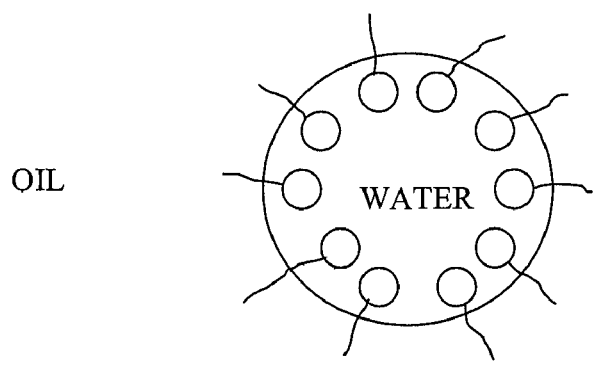
FIG. 5-B
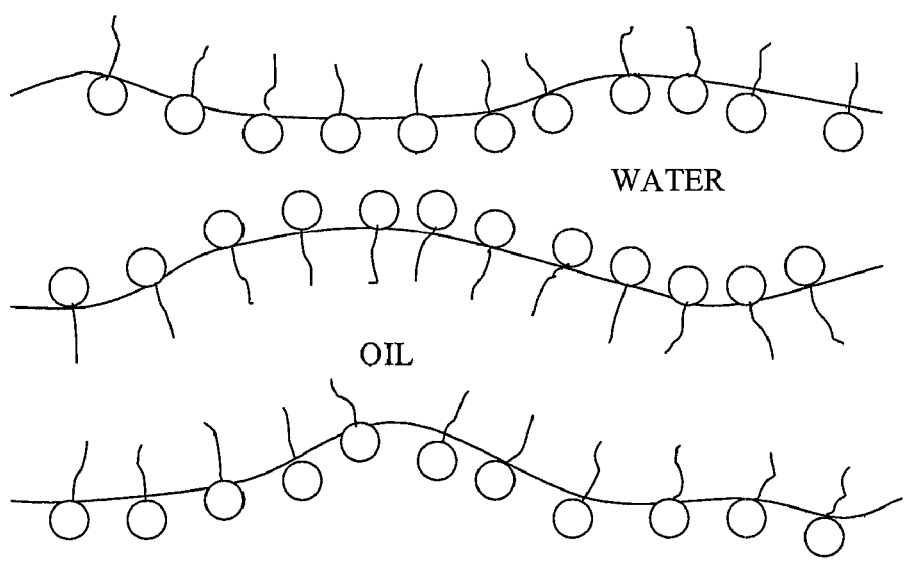
FIG. 5-C

RANDOM COPOLYMER
FIG. 8-A
BLOCK COPOLYMER
FIG. 8-B
TAPERED BLOCK COPOLYMER
FIG.8-C
ALTERNATING BLOCK COPOLYMER
FIG 8-D

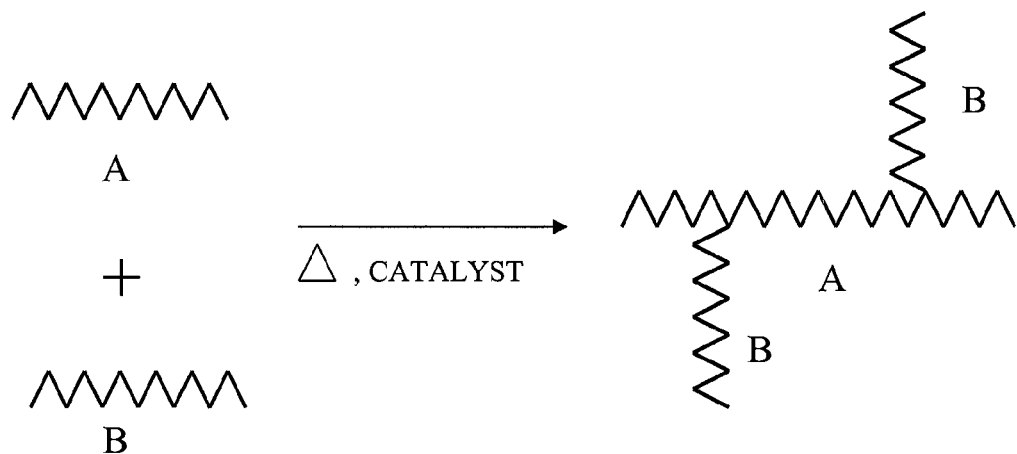
GRAFT COPOLYMERIZATION
FIG. 9-A
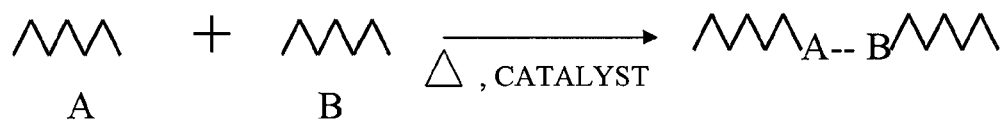
BLOCK COPOLYMERIZATION
BY END-GROUP REACTION
FIG. 9-B

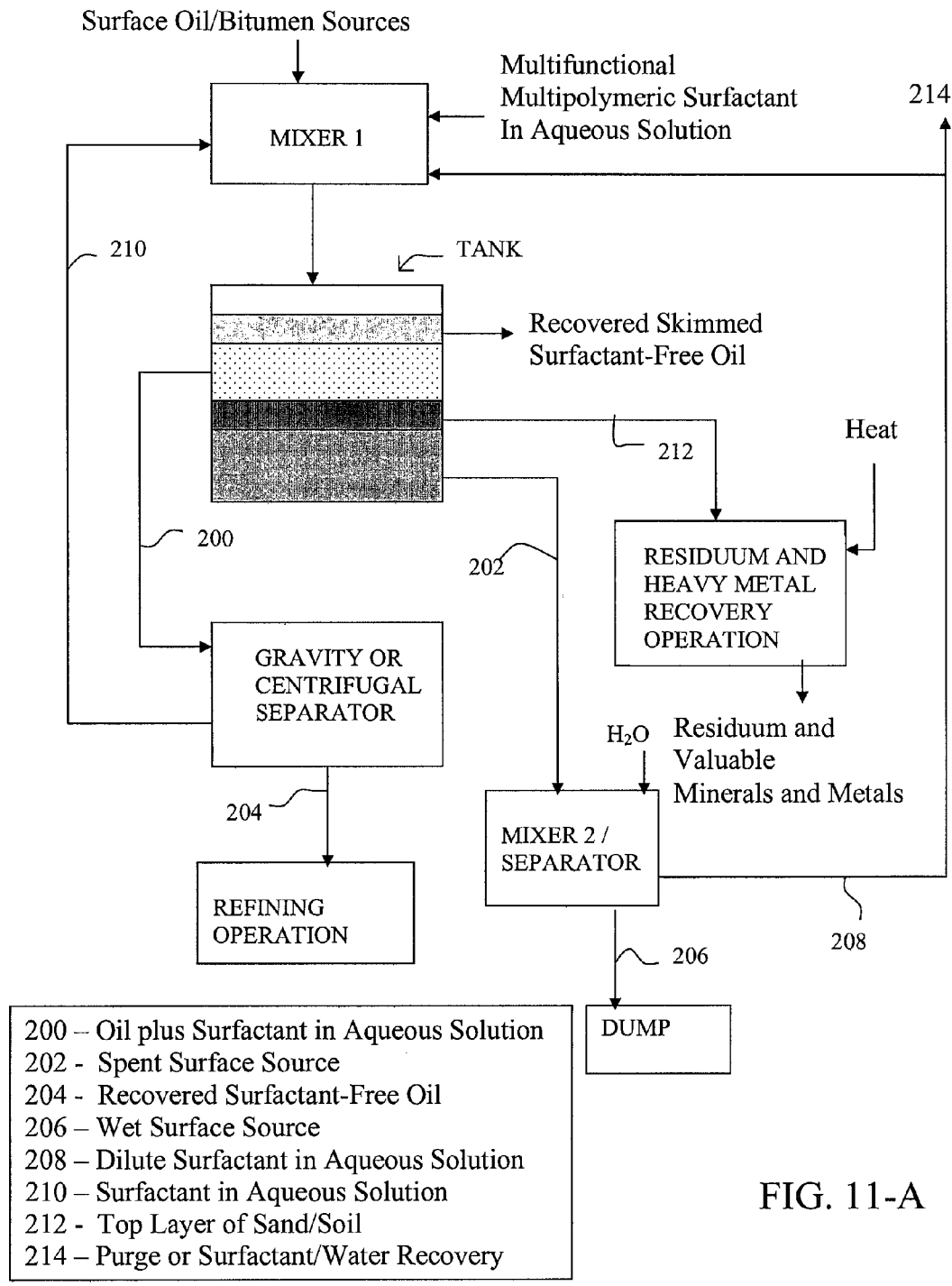
FIG. 11-A

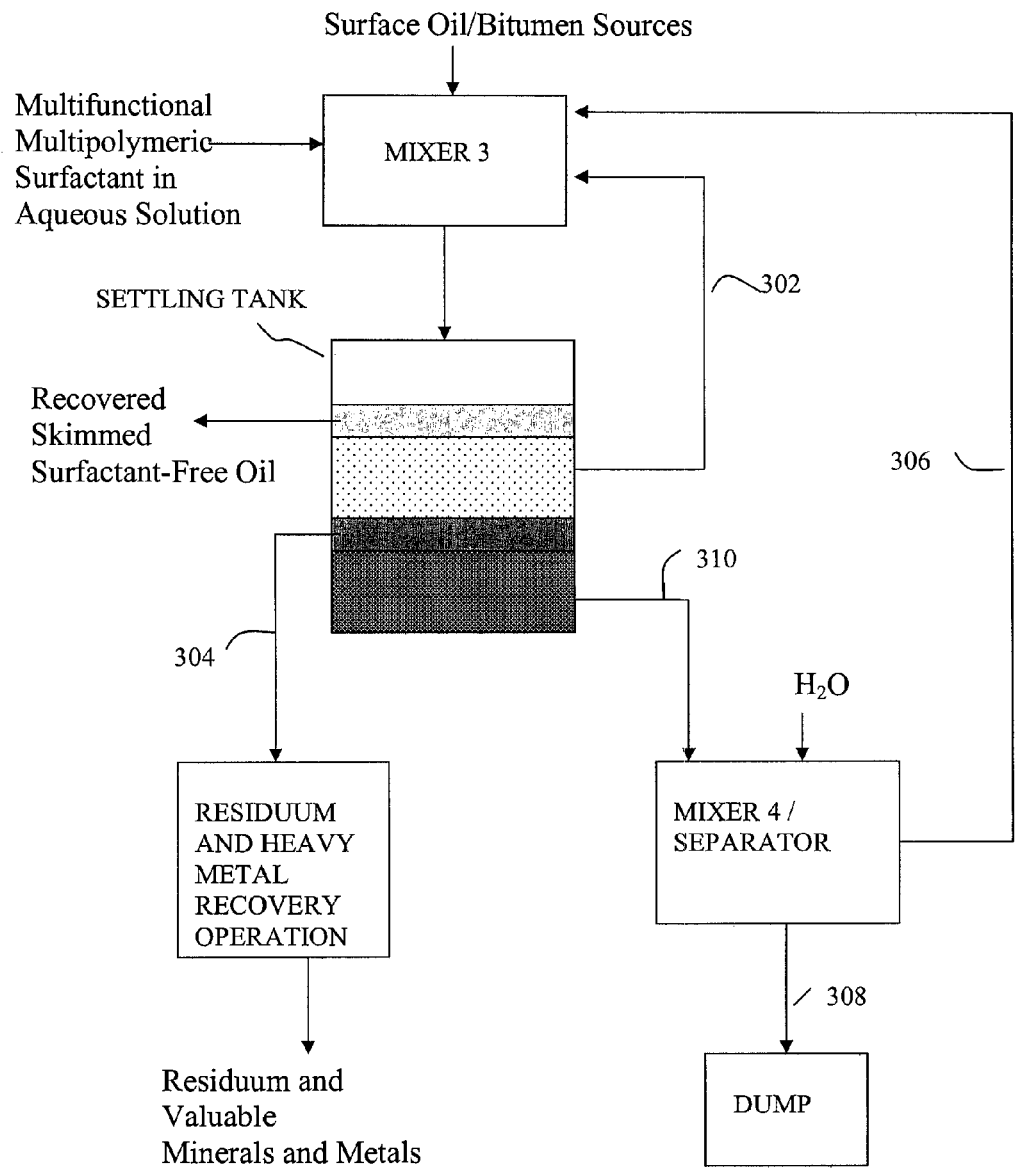
FIG. 11-B

VOC LOSS CONTROL OPERATION

502 – Packing Material
504 – Oil-Saturated Surfactant Solution
506 – Oil Tank
508 – Settled Surfactant
510 – Manifold of Tubes
512 – Top Opening
514 – Bottom Collector
516 – Packed Column

MULTIFUNCTIONAL MULTIPOLYMERIC SURFACTANTS FOR OIL AND BITUMEN RECOVERY AND OTHER APPLICATIONS

CROSS-REFERENCE TO RELATED PATENT APPLICATIONS

This application claims the benefit of provisional patent application No. 60/772,358, filed Feb. 9, 2006, the entire disclosure of which is incorporated herein by reference.

FIELD OF THE INVENTION

This invention pertains to the field of multifunctional polymeric surfactant-based oil/bitumen recovery from subterranean, subsurface, and surface sources and contaminations and to methods for controlling the loss of volatile organic compounds ("VOCs") from oil storage containers. The field of application also includes the recovery of metals (such as vanadium) from the recovered oil/bitumen and the removal of sulfur from crude oil/bitumen sources. These multifunctional polymer surfactants may be used with fossil-based materials that include light and heavy crude oil, bitumen from tar sands and shale deposits, fuel oils, kerosene, gasoline, diesel, motor oils, MTBE, and chlorinated hydrocarbons.

BACKGROUND OF THE INVENTION

Surfactant Formulations for Oil Recovery:

Surfactants normally contain predominantly hydrophilic groups and hydrophobic groups in two regions of the same molecule (FIG. 1). They have been proposed to facilitate recovery of crude oil from subterranean deposits [Gale et al., U.S. Pat. No. 3,946,812], even right after primary oil recovery operations. Improvements to surfactant-based oil recovery operations have been proposed and new methods are being discovered. Usually, surfactants are produced from natural materials (fatty acids, lignin, etc.) or by coupling small molecule reagents into oligomers along with modification reactions. An example of the latter is the formation of alkylaryl sulfonates, whereby a benzene-toluene-xylene (BTX) stream is functionalized with an alpha-olefin stream followed by the sulfonation of the benzene ring.

Early surfactant formulations proposed for oil recovery were based on conventional detergent materials in conjunction with water-flooding [Gale et al., U.S. Pat. No. 3,946,812; Farmer III et al., U.S. Pat. No. 3,943,160] and steam-flooding methods [Isaacs and Daniel, U.S. Pat. No. 4,458,759]. Other materials were proposed to improve the performance of surfactant flooding, such as alkali, co-surfactants, polymers and other chemicals [Gupta, U.S. Pat. No. 4,467,869; Chen and Williams, U.S. Pat. No. 4,577,000; Dardis, U.S. Pat. No. 4,509,597; Stapp, U.S. Pat. No. 4,470,461; Cooke, U.S. Pat. No. 4,460,791]. Other embodiments involve the application of these performance-enhancing agents, particularly the alkali and polymer materials, in separate injection slugs from the surfactant-bearing solution [Gupta, U.S. Pat. No. 4,467,869]. These embodiments have culminated with the so-called ASP technology, which involves the use of an alkali slug, followed by the surfactant slug, and then the relatively viscous aqueous polymer solution slug [Hsu and Hsu, U.S. Pat. No. 6,022,834]. Even though these surfactant-based methods can be very effective in experimentally recovering up to about 80% of tertiary oil-in-place ("OIP"), they involve heavy use of a variety of chemicals, some of them VOCs, which can lead to economic, environmental, and material compatibility problems.

Conventional fatty-acids-based alkylbenzene sulfonate (ABS) detergents proposed in oil recovery applications are strictly categorized as oligomers, since their molecular weights are lower than the so-called entanglement molecular weight, $M_e$ [Fried, 1995]. These materials normally have 18-26 alkyl groups, while polystyrene has an entanglement molecular weight of about 18,100 Daltons, corresponding to around 181 monomer segments. Poly(methyl methacrylate) (PMMA), on the other hand, has a value of $M_e$ equal to 5,900 Daltons, making it one of the more polar polymers, with a low entanglement molecular weight. Polyolefins, which are relatively nonpolar polymers, have still lower values of $M_e$. Thus, a combination of MMA and olefin monomers can have $M_e$ values lower than 5,900 Daltons. The entanglement molecular weight of PMMA could be altered by incorporation of low entanglement molecular weight moeties with other monomers during polymer formation.

Broad molecular weight distribution (MWD) alkyaryl sulfonate surfactant macromolecules have been recently cited by Berger [Berger, P. D., U.S. Patent Application 20050199395] to result in the lowering of the interfacial tension (IFT) between oil and water compared to their equivalent narrow MWD counterparts. From a performance standpoint, this means that surfactant macromolecules of various sizes can form along interfaces of various radii of curvature, allowing the removal of large and smaller oil domains from a solid surface. Surfactant macromolecules usually have narrow molecular weight distributions, and thus there is a need to mix a number of surfactants from different reactor runs to enhance the performance of the mixture.

Mobility Control Operations:

Thickening agents have been added into surfactant-based oil recovery fluids in order to facilitate mobility control [Evani, U.S. Pat. No. 4,184,096; Pathak et al, U.S. Pat. No. 4,657,059; Boudreau, U.S. Pat. No. 6,776,234; Boudreau, U.S. Patent Application Publication No. 2004/0224854]. Materials that are popularly used are based on ionic polyacrylamides ("PAM") and xanthan. Ionic PAM is obtained either by free-radical polymerization of acrylamide monomer with subsequent hydrolysis or by free-radical copolymerization of acrylamide and acrylic acid monomers followed by neutralization of the acrylic acid segments with sodium hydroxide. The degree of hydrolysis or fraction of ionizable groups ranges from 15% to 35%. For these thickening agents, weight average molecular weights are in the order of $10^7$ Daltons, and polydispersity indices are in the 2-3 range. Xanthan, a biopolymer, is produced by fermentation of the bacterium *Xanthamonas campestris*. Weight-average molecular weights for this biopolymer are in the 4-5×10$^6$ Dalton range. Xanthan is monodisperse with polydispersity indices between 1.3 and 1.5. In water or brine solution, xanthan attains a double-stranded conformation stabilized by hydrogen bonds.

Thickener solutions in water have also been used as a flow diversion slug behind injection slugs of alkali and surfactant solutions. An obvious drawback of using conventional thickeners such as polyacrylamides or xanthan gum is the added cost to the oil recovery operation, which is equivalent to $5 to $10 per barrel of oil produced [Mohanty and Caneba, 2005]. None of the surfactant-thickener combinations takes advantage of cost savings by having the appropriate anionic surfactant also function as a thickener or having the thickener closely related chemically to the surfactant such that the combination can be produced from the same reactor or processing equipment. Moss, U.S. Pat. No. 7,125,825, describes an oligomer formulation wherein a surfactant is also a thickener. The hydrophobic portion of the surfactant is a branched or straight-chained saturated or unsaturated aliphatic hydrocarbon with the possibility of having hydroxyalkyl groups. The proposed thickened surfactant has viscoelastic properties. Claimed oilfied applications include hydraulic fracturing, gravel packing, and well completion. None of these applications includes the use of surfactant for oil displacement and recovery. Moreover, this reference cites disadvantages of polymer-based thickening, including compatibility problems with components resulting in chemical precipitation. Finally, thickeners of this reference were claimed to be pseudoplastic, a type that has reduced viscosity under shear, but increased viscosity when the shear is removed. Shpakoff et al., U.S. Pat. Nos. 7,137,447 and 7,055,602, also involves the mixture of an anionic aliphatic surfactant with an aliphatic nonionic additive for enhanced oil recovery performance. Here, both surfactant and additive are of oligomeric size.

Demulsifying Operations:

The action of surfactants as demulsifiers can be understood from an analogy with industrial cleaning operations, as described in a U.S. Environmental Protection Agency website [http://es.epa.gov/technifo/facts/florida/aque-fs.html]. Here, a surfactant/water solution is used to remove soil coated with machining oil from the surface of a metal part. A desirable surfactant is cited to be one that subverts the soil with oil from the part, rather than one that aggressively emulsifies the oil. This surfactant should have more affinity to the metal part than the soil covered with oil. From a processing standpoint, this weak surfactant system lifts the soil with oil and suspends it while the fluid mixture is being agitated. When the agitation is stopped, the oil separates from the surfactant-water solution and rises to the top, while the soil settles to the bottom, thus facilitating the reuse of the aqueous fluid. If an emulsifying surfactant is used, the oil and a portion of the soil will be suspended in the aqueous phase, resulting in a dirty fluid. Recycling the aqueous phase will require a separate operation involving the addition of a demulsifier. In terms of subterranean oilfied operations, tar sand recovery, and even oil clean-up from soil, the analogy calls for the use of surfactant molecules that contain polar hydrophobic portions which will have more affinity to the rock or soil surface than to the oil. Unfortunately, conventional surfactants contain only aliphatic and aromatic hydrophobic groups which have very good affinity to the oil; thus they act as emulsifying surfactants. That is why a separate and costly demulsification operation is done to separate and recover the oil from the surfactant [Amaud, U.S. Pat. No. 6,875,351; Van Den Berg et al., U.S. Pat. No. 6,787,027]. Otherwise, the surfactant can become completely incorporated into the oil, and can never be recovered.

Demulsification is an operation that is used in conjunction with conventional surfactant-based oil/bitumen recoveries. Oil/bitumen is normally well-dispersed within surfactant domains, and addition of a demulsifier is needed to free the oil/bitumen from the surfactant. Examples of commercial demulsifiers are polyol, amine, and resin products by Clearwater (Houston, Tex.), ALKEN® product line by Alken-Murray Corp., and Kernelix™ line by Uniqema. Other approaches to demulsification have been cited in the literature [Presley and Harrison, 1642824 August, 1972 DE 252/330; Deng et al, 2004; Newcombe, U.S. Pat. No. 4,216,079; Balzer, U.S. Pat. No. 4,842,067]. In order to facilitate the reuse of surfactant for oil/bitumen recovery, the surfactant would have to be separated from the demulsifier, which is normally a very difficult procedure, comprising liquid-liquid or solid-liquid extraction followed by distillation or vacuum stripping. If the surfactant has demulsification characteristics, then this separation may not be necessary, and surfactant reuse may become possible. This has been illustrated with oligomeric surfactants in Guymon, U.S. Pat. No. 5,252,138, which used a surfactant from the group consisting of a linear alcohol having carbon atoms within the range on the order of about eight to fifteen carbon atoms and ethylene oxide units on carbon atoms within the range on the order of about two to eight ethylene oxide units. However, no polymeric surfactants with demulsification characteristics have been identified for use in oil recovery and VOC loss control applications.

Oil Recovery from Surface Sources:

Methods for recovery of bitumen and fossil-based materials from tar sands and their tailings, shale oil, and surface/subsurface spills include thermal [Bouck, U.S. Pat. No. 4,412,585]; steam-assisted [Widmyer, U.S. Pat. No. 4,34, 812; Needham, U.S. Pat. No. 4,068,717]; chemical [Hardin, U.S. Pat. No. 4,110,195; Mitchell, U.S. Pat. No. 4,410,551; Miller, U.S. Pat. No. 4,470,899; Graham et al, U.S. Pat. No. 4,722,782; Taylor, U.S. Pat. No. 4,822,481; Graham et al, U.S. Pat. No. 5,143,598]; and surfactant-based methods [Merchant Jr. and Smith Jr., U.S. Pat. No. 4,407,707; Siefkin and Boesiger, U.S. Pat. No. 4,368,111; Thirumalachar and Narasimhan Jr., U.S. Pat. No. 4,929,341; Guymon, U.S. Pat. No. 5,252,138; Olah, U.S. Pat. No. 5,000,872; Schramm and Smith, U.S. Pat. No. 5,009,773; Gregoli et al, U.S. Pat. No. 5,340,467; Ashrawi, U.S. Pat. No. 5,282,984; Catla, U.S. Pat. No. 5,746,909]. All of these methods can be implemented through strip-mining or excavation. In situ methods have also been proposed [Yildirim, U.S. Pat. No. 4,406,499]. Strip-mining or excavation is being implemented and has resulted in the alteration of the landscape, as well as enormous man-made lakes (such as Lake Mildred in Alberta, Canada) which, because they contain tailings from the bitumen extraction operation on the lakebed, are called tailings ponds. In situ extraction causes little or no disturbance to the landscape, but is an inefficient method. One in situ approach uses the steam-water-assisted-gravity (SAG) method for in situ recovery of bitumen from buried tar sands. Such an operation is energy intensive, since the steam is usually produced using natural gas.

SUMMARY OF THE INVENTION

One aspect of the present invention provides methods for recovering fossil-based materials from oil sources using multifunctional, multipolymer surfactant mixtures. The oil sources from which the fossil-based materials are recovered may be surface oil sources, sub-surface oil sources, subterranean oil sources, or surface and sub-surface oil contaminations, such as oil spills on soil. Another aspect of the invention provides methods for reducing the loss of volatile organic compounds (VOCs) from oil storage containers using multifunctional, multipolymer surfactants.

The multifunctional, multipolymer surfactants are characterized by a hydrophobic part and a hydrophilic part. The hydrophobic part of the polymer surfactants includes functionalities that impart a polarity of greater than 0 Debye to the hydrophobic part. Thus, the hydrophobic parts of the polymer surfactants are easily distinguishable from conventional surfactants used in oil recovery and VOC loss control which have hydrophobic parts composed of hydrocarbon chains with a Debye value of 0. In some instances the hydrophobic part of the polymer surfactant has a polarity of at least about 0.5 Debye. This includes embodiments wherein the hydrophobic part of the surfactant has a polarity of at least about 1 Debye, further includes embodiments wherein the hydrophobic part of the surfactant has a polarity of at least about 1.5 Debye and still further includes embodiments wherein the hydrophobic part of the surfactant has a polarity of at least about 2 Debye. Alternatively, the polarity of the hydrophobic part of the surfactants can be measured using the Hansen polar solubility parameter ($\delta_p$). Using this measure, the hydrophobic parts of the polymer surfactants have a Hansen polar solubility parameter greater than 0. This includes embodiments where the Hansen polar solubility parameter is at least about 0 $(cal/cm^3)^{1/2}$, further includes embodiments where the Hansen polar solubility parameter is at least about 0.7 $(cal/cm^3)^{1/2}$, and still further includes embodiments where the Hansen polar solubility parameter is at least about 0.9 $(cal/cm^3)^{1/2}$.

The polymer surfactants are further characterized by molecular weights that are above their entanglement weights. As such, the polymer surfactants are readily distinguishable from conventional oligomer-type surfactants used in oil recovery and VOC loss control. (For the purposes of this disclosure, an oligomer is a molecule that has a molecular weight below its entanglement molecular weight.) In some instances, the polymer surfactants may have a number average molecular weight that is at least 20%, at least 50%, or at least 100% higher than the entanglement molecular weight. For example, polymer surfactants comprising copolymers of vinyl acetate and acrylic acid might have number average molecular weights of at least about 10,000, at least about 30,000, or at least about 40,000.

These two characteristics are particularly advantageous because they provide polymer surfactants with demulsifying characteristics. As such, the polymer surfactants can be designed such that they do not emulsify oils and, therefore, are able to separate oils from an oil source without requiring the addition of a separate demulsifier, a demulsifying environment, or a separate demulsification step to separate the surfactants from the oils after the oil has been recovered from the oil sources. This feature reduces the cost of, complexity of, and time required to carry out oil recovery relative to oil recovery processes that employ other types of surfactants. A natural result of the demulsifying characteristics of the polymer surfactants is that they tend to produce either a Type III mesoscale Windsor structure or vesicle structure in an oil/surfactant mixture. This distinguishes the polymer surfactants from more conventional surfactants that produce Type I mesoscale Windsor structures or Type II mesoscale Windsor structures in an oil/surfactant mixture.

Another desirable characteristic of the polymer surfactants is a broad polydispersity index. For example, the polymer surfactants may be produced with a polydispersity index of at least 1, at least 2, at least 3, or even higher. A basic method for recovering fossil-based materials from surface or sub-surface oil sources or contaminations includes the steps of contacting the surface or sub-surface oil source or contamination with an aqueous fluid containing a multifunctional polymer surfactant having a molecular weight greater than its entanglement molecular weight to provide a fluid mixture comprising fossil-based materials, wherein the polymer surfactant comprises a hydrophobic part and a hydrophilic part, the hydrophobic part comprising functionalities that impart a dipole moment greater than 0 Debye to the hydrophobic part; and separating an oil phase comprising fossil-based materials from the fluid mixture or allowing an oil phase comprising fossil-based materials to separate from the fluid mixture.

In one embodiment of this method, the step of contacting the surface or sub-surface oil source of contamination is carried out by mixing the surface or sub-surface oil source or contamination with the aqueous fluid containing the continuous composition spectrum multifunctional polymer surfactant surfactant-thickener mixture to provide the fluid mixture. The process of producing this surfactant-thickener mixture is described in paragraph 0073. In such embodiments the method typically also includes the steps of separating a fluid phase comprising the polymer surfactant-thickener mixture from the fluid mixture, or allowing a fluid phase comprising the polymer surfactant thickener mixture to separate from the fluid mixture; and separating a solid phase comprising solids from the surface or sub-surface oil source or contamination from the fluid mixture, or allowing a solid phase comprising solids from the surface or sub-surface oil source or contamination to separate from the fluid mixture. This embodiment has the additional advantage of facilitating the recovery of metals, such as vanadium, from the fossil-based materials. This is because the top layer of solids (e.g., soil, sand, etc.) in the separated solid phase tends to trap heavy crude or residuum containing heavy metals in the presence of the polymer surfactants, thereby concentrating the metals in this top layer. Thus, the top layer of the solid phase can be removed and the metals contained therein can be separated out.

In an alternative embodiment, the step of contacting the surface or sub-surface oil source of contamination is carried out by injecting a solution containing the aqueous fluid into the surface or sub-surface oil source or contamination to provide the fluid mixture. In these embodiments the resulting fluid mixture is collected from a production site prior to separating an oil phase comprising fossil-based materials from the fluid mixture.

A basic method for recovering fossil-based materials from a subterranean oil source includes the steps of injecting a slug comprising an aqueous fluid containing a multifunctional polymer surfactant having a molecular weight greater than its entanglement molecular weight to provide a fluid mixture comprising fossil-based materials into an injection well to provide a subterranean fluid mixture, wherein the polymer surfactant comprises a hydrophobic part and a hydrophilic part, and the hydrophobic part comprising functionalities that impart a dipole moment greater than 0 Debye to the hydrophobic part; collecting the fluid mixture from a production well; and separating an oil phase comprising fossil-based materials from the fluid mixture or allowing an oil phase comprising fossil-based materials to separate from the fluid mixture.

A basic method for preventing or reducing the loss of volatile hydrocarbons from an oil-containing tank includes the steps of saturating a multifunctional polymer surfactant with oil, the polymer surfactant having a molecular weight greater than its entanglement molecular weight, wherein the polymer surfactant comprises a hydrophobic part and a hydrophilic part, the hydrophobic part comprising functionalities that impart a dipole moment greater than 0 Debye to the hydrophobic part; foaming the multifunctional polymer surfactant; and applying the foamed multifunctional polymer surfactant to the surface of the oil contained in the tank. In one variation of this method, the polymer surfactant is recycled, refoamed and reapplied in a continuous or periodic cycle to provide a cost-effective means of reducing VOC losses. In such embodiments, additional foamed multifunctional polymer surfactant is applied to the surface of the oil after the previous application has collapsed and sunk below the surface of the oil contained in the tank. This additional foamed multifunctional polymer surfactant is desirably obtained by removing the collapsed and sunken multifunctional polymer surfactant from a previous application and re-foaming it.

In order to clarify the scope of the description that follows, the following definitions are provided:

Fossil-Based Material: Naturally oil-rich materials that came from fossilization, degradation, and/or decomposition of organic and inorganic matter, as well as their processed equivalents and products. These include, but are not limited to, light and heavy crude oil, bitumen from tar sands and shale deposits, fuel oils, kerosene, gasoline, diesel, motor oils, MTBE, chlorinated hydrocarbons, etc.

Type I, II, and III Mesoscale Windsor Structures: These are defined below, in conjunction with FIG. 4A-4C.

Vesicle Type I Structure: This is similar to a Type I mesoscale Windsor structure, except that it includes more than one layer of surfactant around an oily core and produces particles (micelles) having micrometer-sized dimensions, rather than nanometer-sized dimensions.

Petroleum Hydrocarbons: Flowable, water-insoluble material, a significant portion of which contains carbon and hydrogen compounds.

Subterranean Oil Source: Light and heavy crude petroleum trapped underground in porous rock matrices originally under pressure within anticline, salt, reef, etc., formations.

Surface Oil Source: Oil, bitumen, oil spills, etc., on the surface or a few feet below the ground surface. These include, but are not limited to, tar sands and their tailings, shale deposits, asphalt and industrial sludge.

Sub-surface Oil Source: Bitumen, shale, etc., found below a few feet from the ground surface. Tar sands and buried oily or non-oily contaminants are normally found in relatively loose sand, gravel, or soil. However, shale oil is usually found in harder, consolidated, porous rock. These include tar sands and their buried tailings, shale deposits, buried asphalt, industrial sludge, and other contaminants.

Hydrophobic Part of a Polymer: The segment, or segments, of the polymer molecule that segregate themselves from the hydrophilic portions and from water when the polymer is in water. These segments may be spatially contiguous along the polymer chain or may be separated by non-hydrophobic segments within the polymer.

Hydrophilic Part of a Polymer: The segment, or segments, of the polymer molecule that segregate themselves from the hydrophilic portions when the polymer is in water. These segments may be spatially contiguous along the polymer chain or may be separated by non-hydrophilic segments within the polymer.

Non-Emulsifying Surfactant: A surfactant does not emulsify oils if the surfactant suspends the oils during agitation, but separates from the oils, without need for a demulsifier, a demulsifying environment or a separate demulsifying step, once the agitation ceases.

Further objects, features, and advantages of the invention will be apparent from the following detailed description when taken in conjunction with the accompanying drawings.

BRIEF DESCRIPTION OF THE DRAWINGS

FIG. 1 shows examples of conventional anionic (5-A and 5-C) and nonionic (5-B) surfactants that contain hydrophilic and hydrophobic sections.

FIG. 5A is a Type I mesoscale fluid structure showing the locations of the hydrophilic and hydrophobic groups in an oil-in-water system.

FIG. 5B is a Type II mesoscale fluid structure showing the locations of the hydrophilic and hydrophobic groups in a water-in-oil system.

FIG. 5C is a Type III mesoscale fluid structure showing the locations of the hydrophilic and hydrophobic groups in a system where water and oil exist as a co-continuous domain structure.

FIGS. 8A, 8B, 8C and 8D show the basic copolymer architecture of Vinyl Acetate (open beads) and Acrylic Acid (filled beads) segments produced from FRRPP process.

FIGS. 9A and 9B show graft and block copolymerization methods using reactive macromolecules A and B.

FIGS. 11A and 11B are flow charts of application of the polymer surfactants of the present invention to oil recovery from surface sources in portable version (11-A) and in a relatively high residence time version (11-B).

DETAILED DESCRIPTION OF THE INVENTION

Polymer Surfactant Composition and Synthesis

This invention pertains to compositions for the recovery of oil/bitumen and other fossil-based materials comprising continuous composition spectrum multifunctional, multipolymeric surfactant mixtures that contain monomeric, oligomeric, and/or polymeric units containing functional groups that are chemically and functionally similar to various small-molecule, oligomeric, and polymeric additives used in various stages of oil/bitumen recovery operations. In conventional oil/bitumen recovery, compositions and applications, added effectiveness in oil/bitumen recovery operations is imparted through the use of various additive materials in combination with surfactants or through separate processing steps in an overall oil/bitumen recovery operation. In this invention, a collection of monomers, oligomers, and/or polymers possessing various chemical groups are incorporated within a set of polymer chains that make up multifunctional, multipolymer surfactant mixtures of an oil/bitumen recovery composition. These functional groups may be naturally present in the raw materials used to produce the multifunctional multipolymer, or may be purposely or naturally altered by modifying reactions. A subpolymer (equivalent to a number of monomer segments) representation of these chemical functionalities in a portion of the entire polymer is shown in FIG. 1, which is depicted by the A, B, C, D . . . —functionalities emanating from various subpolymers (represented by grey ovals).

Figure 2:
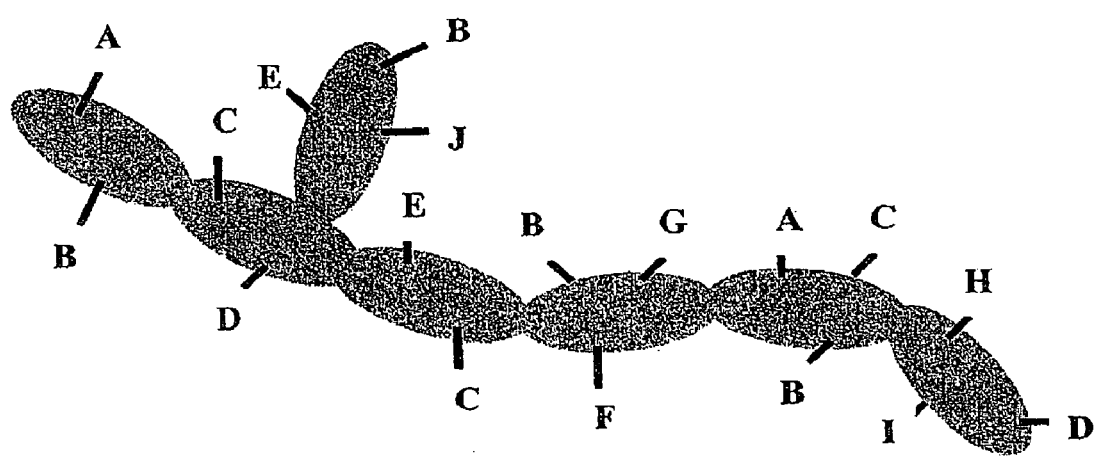
FIG. 2 is a subpolymer representation of the multifunctional multipolymeric surfactant. Density and variety of functional groups (A ,B, C, D, . . . ) around subpolymers is exaggerated relative to a typical polymer surfactant for clearer illustration. In a typical embodiment, the number of functional groups can be as many as two per interior segment and three for end segments, while total variety of functional groups can be as small as three.

Table 1. Possible functionalities (A, B, C, D, . . . ) for the structural representation of the continuous composition sprectrum multifunctional multipolymeric surfactant mixture shown in FIG. 2. Examples of commercial polymers with various functionality classes as well as their corresponding small-molecule counterparts are given. These small-molecule counterparts could be proposed to be injected into oil fields to facilitate oil extraction.

TABLE-US-00001 TABLE 1 Examples of A, B, C, D . . . A, B, C, D . . . —Functionality found in Functionality Examples of A, B, C, D . . . —Functionality found small-molecule Class in Commercial Polymers compounds Hydroxyl Poly(vinyl alcohol) Methyl Alcohol, Ethyl Alcohol, Isopropyl Alcohol Ketone Poly(methyl vinyl ketone), Poly(isopropyl vinyl Acetone, Methyl Ethyl ketone), Ethylene-Carbon Monoxide Ketone, Methyl Isobutyl Copolymers Ketone Ester Poly(vinyl acetate), Poly(methyl acrylate), Methyl Acetate, Ethyl Poly(ethyl acrylate), Poly(methyl Acetate, Propyl Acetate, methacrylate), poly(butyl acrylate), Ethylene-Butyl Acetate Vinyl Acetate Copolymers Carboxylic acid Poly(acrylic acid), Poly(methacrylic acid), Acetic Acid, Citric Acid Ethylene-Acrylic Acid Copolymers, Ethylene-Methacrylic Acid Copolymers Amine Poly(acrylamide), Poly(isopropyl acrylamide) Ethanolamine, Ethylamines, Propylamines Salts Neutralized Poly(acrylic acid), such as Ammonium Acetate, Poly(Ammonium Acrylate), Poly(Sodium Sodium Acetate Acrylate), Poly(Potassium Acrylate); corresponding neutralized Poly(methacrylic acid) Aromatic Polystyrene Benzene, Toluene, Xylene Hydrocarbon Aliphatic Polyolefins Pentane, Hexanes, Hydrocarbon Heptane, Octane Mixed Hydrogenated Styrene-Butadiene Copolymers Naphtha, Gasoline, Hydrocarbons Kerosene Table 1 shows functionality classes that will impart both hydrophobicity and hydrophilicity in the overall polymer. The various multipolymeric macromolecules that make up the present polymer surfactants desirably have both hydrophobic and hydrophilic functionalities, either in the same macromolecules or bridged with highly compatible groups of functionalities from different macromolecules.

The various incorporated chemical segments that make up the multipolymer surfactants are arranged in a variety of chain architectures in order to enhance all desirable properties. To make an analogy with biological systems, multipolymers would be analogous to DNA, with gene sequences corresponding to various functions. A biological macromolecule that possesses only one segment type is a polysaccharide sugar. Its analogy in polymers is the so-called homopolymer, such as polyethylene, polypropylene, polystyrene, poly(vinyl chloride), poly(vinyl acetate), poly(acrylic acid), poly(methacrylic acid), etc., all of which have only one type of segment within them. Macromolecule chains having two and three types of monomer segments are called copolymers and terpolymers, respectively. For the general case of two or more types of segments, they are called multipolymers. This invention also pertains to polymeric materials related to the multifunctional multipolymeric surfactants, which are produced in the same mixture with the surfactant. Normally these related macromolecules have slightly deviated chemical features and/or compositions compared to the surfactant macromolecules, such that the whole mixture would be compatible in water.

Possible features and functionalities of the multipolymers composed of macromolecules with deviated structures/compositions include, but are not limited to:
1. Vinyl chain backbone for affinity to crude oil/bitumen, which is mostly made up of chemically similar hydrocarbons;
2. Carboxylic acid or amine/amide functionalities for neutralization with various bases/acids, to impart salt tolerance and various degrees of hydrophilicity and acid-base characteristics;
3. Ester and/or alcohol functionalities to impart co-surfactant characteristics, foam stability, long-term biodegradability, and demulsification characteristics;
4. Relatively broad molecular weight distribution of the multipolymer macromolecule for enhanced lowering of the interfacial tension (IFT);
5. High molecular weight polymer with alcohol functionalities to impart sterically-hindered colloidal properties;
6. Ester functionality possessing reduced hydrophilicity as a compatible high molecular weight component, which serves as a viscosifier for enhanced mobility control in subterranean oil recovery operations;
7. Functionalities that can be derived from products of free radical polymerization chemistry using monomers, such as olefins, styrenic, vinyls, vinylidenes, acrylics, methacrylics, ketones, ethers, halogens, bases, esters, and alcohols from esters;
8. Functionalities that can be derived from products of ionic polymerization chemistry using monomers, such as olefins, styrenic, acrylics, and methacrylics;
9. Functionalities that can be derived from products of polycondensation or step-growth chemistry containing, but not limited to, ester, carbonate, amide, phenolic, formaldehyde, urethane, urea, melamine, and epoxide segments; and
10. Functionalities that can be derived from products of ring-opening polymerization chemistry using ringed molecules such as silicones, ethers, lactones, lactides, anhydrides, lactams, cycloalkenes, ethyleneimines, and oxazolines.

Figure 3:
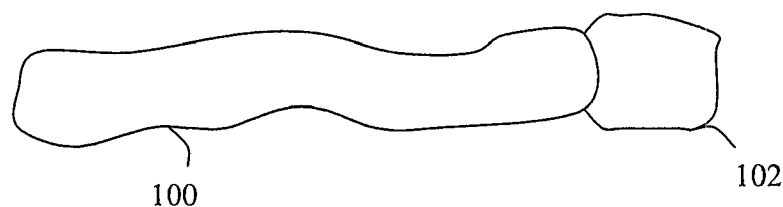
FIG. 3 is an exploded representation of a surfactant molecule.
Figure 4:
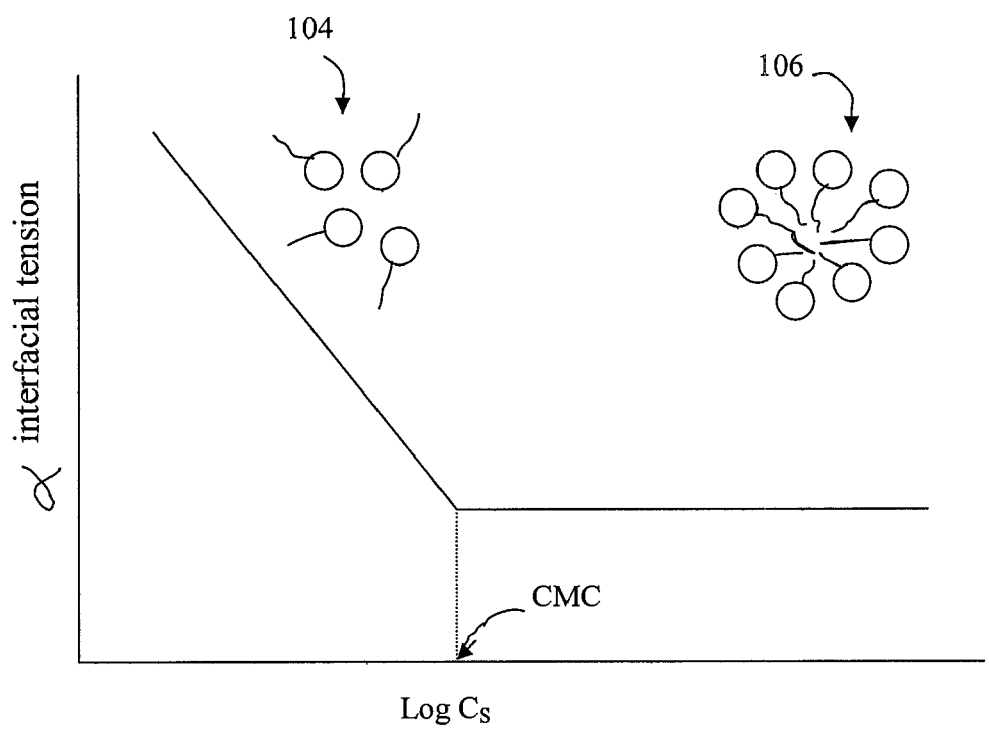
FIG. 4 is a graph showing the relationship between interfacial tension ($\gamma$) and concentration ($C_S$) of surfactant macromolecules.

The reference situation is one in which the multipolymer has surfactancy properties; thus, the chains contain both hydrophilic (100) and hydrophobic (102) groups, as seen in FIG. 3. Referring to FIG. 4, at a surfactant concentration below the so-called critical micelle concentration ("CMC"), the surfactant molecules are present in solution as isolated polymeric surfactant molecules (104). Above the CMC, the surfactant molecules arrange themselves into aggregates called micelles (106), which can result in three mesoscale (between microscopic and macroscopic scales) Windsor Type I, II, and III structures, wherein the hydrophilic groups find themselves on the water side of the interface while the hydrophobic groups are on the oil side of the interface. In Type I mesoscale Windsor (or oil-in-water, "O/W") structures, the water phase completely covers the oil phase with the hydrophilic end of the surfactant molecules aggregating outwardly along the interfacial region (FIG. 5A). In Type II mesoscale Windsor (or water-in-oil, "W/O") structures, the oil phase completely covers the water phase with the hydrophobic end of the surfactant molecules aggregating outwardly along the interfacial region (FIG. 5B). In Type III mesoscale Windsor structures, both the water and oil phases exist as a co-continuous domain structure with the surfactant molecules aggregated along the interfacial region (FIG. 5C). In oil recovery applications, a Type III structure is preferred because it is associated with very low interfacial tensions [Pope and Baviere, 1991]. The following features of surfactant molecules were also cited by Pope and Baviere to promote Type III behavior:

1. Increased molecular weight (or branching) of surfactant-hydrophobic part of oligomeric surfactants;
2. Decreased polarity of the hydrophilic part of the surfactant;
3. Increased long-chain alcohol concentration within the surfactant oligomer macromolecule; and
4. Decreased short-chain alcohol concentration within the surfactant oligomer macromolecule.

In contrast, the present invention uses polymeric surfactants, wherein Type III behavior is promoted by an increase in the polarity of the hydrophobic part of the surfactant relative to a hydrocarbon. Thus, while the polarity level of the hydrophobic part of the surfactant is greater than that of a simple hydrocarbon (and in some instances, much greater), the relatively large size of the still more polar hydrophilic part promotes Type III behavior. Thus, the relatively high polarity of the hydrophobic part in combination with a sufficiently polar (e.g., ionic or polar, nonionic) hydrophilic part provides a multifunctional, multipolymeric surfactant that is more effective at oil/bitumen recovery and VOC loss prevention than more conventional oligomer surfactants.

The polarity of a small molecule may be measured by the value of its dipole moment. Symmetric hydrocarbon molecules, such as linear aliphatics and cycloaliphatics, have dipole moments of zero Debye [Prausnitz, Lichtenthaler, and de Azevedo, 1999]. Structurally and electronically asymmetric compounds have dipole moments greater than zero. Another quantitative measure of polarity is the hydrogen bonding number [Hansen, 1999]. Compounds with a relatively large hydrogen bonding index are relatively polar. In addition, they tend to be hydrophilic as well. Of course, ionic compounds are classically considered hydrophilic. In order to determine the polarity of a multipolymer, one merely determines the polarities of the segments or groups of segments from which the multipolymer is made compared to the closest small molecule analog. A practical way of characterizing the polarity of a multipolymer segment or group of segments is through the Hansen solubility parameter, $\delta$, which is related to the dispersion or nonpolar ($\delta_d$ or $\delta_n$), polar ($\delta_p$), and hydrogen bonding ($\delta_h$) contributions [Hansen, 1999].

$$\delta^2 = \delta_d^2 + \delta_p^2 + \delta_h^2 \qquad (1).$$

Based on the tabulations for the various contributions to the total solubility parameter of various compounds, polar materials have values of $\delta_p$, greater than 0 (cal/cm$^3$)$^{1/2}$. Thus, the polarity of the hydrophobic portion of the multifunctional multipolymeric surfactants in this invention have a polar solubility parameter, $\delta_p$, greater than 0 (cal/cm$^3$)$^{1/2}$. For the hydrophilic part, which could either be ionic or nonionic, the hydrogen-bonding solubility parameter, $\delta_h$, is greater than 1.0 (cal/cm$^3$)$^{1/2}$. Thus, if one looks into the various functionalities cited in Table 1, most of them fall within the range of solubility parameters claimed in this invention, except for aliphatic and cycloaliphatic compounds/functionalities. This is not a necessarily a fallacy because as long as these nonpolar groups/functionalities are mixed with polar groups/functionalities within the hydrophobic part of the polymer surfactant, the overall effect is still polar. In fact, a quantitative measure of a combined solubility parameter (i.e., dispersion, polar, and hydrogen-bonding contributions) for n groups/functionalities is obtained as a volume-average $$\delta = \sum_{i=1}^{n} \Phi_i \delta_i \qquad (2)$$

where $\Phi_i$ is the volume fraction of group/functionality i in the hydrophobic or hydrophilic portion of the multipolymeric surfactant. Volume fractions or various compounds closely representing various functional groups in the surfactant can be obtained from various sources [Prausnitz, Lichtenthaler, and de Azevedo, 1999].

In addition to recovering oil/bitumen without the need for demulsifiers, the present polymer surfactants facilitate the recovery of heavy crude which may contain valuable metals. The recovery of this heavy crude is facilitated by macromolecular entanglements found in polymer surfactants which are manifested by strong cohesive forces within hydrophobic surfactant domains, making them especially effective in extracting high viscosity oils and/or crude/bitumen components that contain complexed heavy metals. The importance of these strong cohesive forces is highlighted by the understanding that a relatively high capillary number, Nc, is needed for oil/bitumen displacement from solid surfaces, such as sand and soils present in surface oil sources and oil spills. Note that the capillary number is related to the displacing fluid (normally aqueous fluid) viscosity, $\mu$, interstitial velocity, V, and interfacial tension [Pope and Baviere, 1991], $\gamma$, $$N_C = \mu V / \gamma \qquad (3)$$

i.e., one needs relatively high aqueous phase viscosity and velocity, and relatively low interfacial tension for efficient oil/bitumen displacement. The polymeric surfactants can achieve order-of-magnitude increases in the capillary number based on both an increase in viscosity and a decrease in interfacial tension relative to more conventional oligomer-based surfactants. In an example of a process for recovering heavy crude from a surface source containing mineral solids, the strong cohesive forces of the hydrophobic parts of the polymer surfactants in an aqueous phase (desirably subject to convective currents) result in the formation of aqueous-surfactant domains in contact with heavy oil components (including metal and fine soil/sand particles) that do not easily break up into smaller drops/particles. These larger aqueous-surfactant domains in contact with heavy oil components have enough buoyant force to raise the latter to the top of the soil or sand column that settles out of the aqueous phase, but not enough to rise to the surface of the aqueous phase. The ability to concentrate the heavy oil and the metals contained therein in this manner greatly simplifies the recovery (or removal) of metals and other compounds (e.g., sulfur) from surface oil sources.

A practical approach to the identification of Type III structures is through observing the turbidity or state of cloudiness of surfactant solutions. For both Type I and II structures, the fluid will appear transparent, while Type III structures will appear turbid or cloudy. A time-resolved light scattering device can be used to formally differentiate between Type I, Type II, and Type III structures. For both Types I and II, the angle $\theta$ of scattered light is close to 0°, while for Type III structures it is much larger (in the order of 30°). In fact, with a Type III bi-continuous structure having a single dominant interdomain distance, the scattering pattern will exhibit a maximum at a scattering angle, $\theta = \theta d_m$, and the interdomain distance $d_m$, is calculated from [Snyder et al., 1983]:

$$d_m = \delta / 2n \sin(\theta_m / 2) \qquad (4)$$

where λ is the wavelength of the incident laser light and n is the refractive index of the medium (Water). That is why when the subtended angle, θ, of the scattered beam is close to 0°, the characteristic length (or domain size) is relatively small, such as the size of micelles.

Desired functionalities can be incorporated into the polymer surfactants as entire macromolecular chains by introducing in a controlled fashion monomeric, oligomeric, and/or polymeric units having desired properties. The use of free-radical chemistry to build various multipolymers allows this because it can accept a variety of monomers, such as olefins, vinylidines, acrylics, hydroxyalky acrylics, hydroxyalkyl methacrylics, methacrylics, vinyl ketones, acrylonitrile, vinyl ethers, vinyl halogens, vinyl acids, styrenics, vinyl bases, acrylamides, alkyl acrylamides, vinyl esters, vinyl alcohols from vinyl esters, vinyl butyral from vinyl alcohol, etc., that are available with a variety of chemical and physical properties. For example, acrylic and methacrylic acid monomers produce hydrophilic groups in polymer chains, and if used in un-neutralized form, they have been shown to act as suspending agents [Boudreau, U.S. Patent Application 20040224854]. Since alcohols [Stapp and Chaney, U.S. Pat. No. 4,490,263] and esters [Boudreau, U.S. Patent Application 20040224854] have been shown to be advantageously included in surfactant formulations, vinyl alcohol- and vinyl ester-bearing monomers that are incorporated in surfactant polymer chains should also provide property enhancements. These enhancements include co-surfactancy, biodegradability, thickening properties, and foaming ability.

A free radical initiator may be used to start the polymerization through the use of one or more mechanisms such as photochemical initiation, chemical initiation, thermal initiation, redox initiation, degradative initiation, ultrasonic initiation, or the like. Heat-activated chemical initiators are preferably selected from azo-type initiators, peroxide-type initiators, or mixtures thereof. Examples of azo-type initiators include, but are not limited to, azobisisobutyronitrile (AIBN), 2,2'-azobis (N,N'-dimethyleneisobutyramide) dihydrochloride (or VA-044 of Wako Chemical Co.), 2,2'-azobis (2,4-dimethyl valeronitrile) (or V-65 of Wako Chemical Co.), 1,1'-azobis)(1-cyclohexane carbonitrile), 4,4'-azobis(4-cyanopentanoic acid), or mixtures thereof. Examples of peroxide-type initiators include, but are not limited to, diacyl peroxides, peroxy esters, peroxy ketals, di-alkyl peroxides and hydroperoxides, specifically benzoyl peroxide, deconoyl peroxide, lauroyl peroxide, succinic acid peroxide, cumere peroxide, t-butyl peroxy acetate, 2,2' di(t-butyl peroxy) butane, diallyl peroxide, cumyl peroxide, or mixtures thereof. It is possible to mix azo-type and peroxy-type initiators, especially if the desire is to produce broad molecular distribution polymers and control heat generation of the polymerization exotherm at the same time. Redox-based chemical initiation, including redox intiation in organic fluids, is also popularly used, especially in emulsion polymerization processes in water. In redox initiation, two solutions are prepared: a reducing agent solution and an oxidizing agent solution. Usually, the oxidizing agent solution contains the monomer(s) and oxidizing agent, such as peroxides. Reducing agents are usually made up of ferrous and thiosulfate ions. The advantage of redox initiation is that polymerization can be started even at room temperature, without having to store the initiators at very low temperatures.

The mechanism of free-radical multipolymerization generally follows a consistent pattern. Monomer sequences within growing chains are dictated by the relative reactivity ratios of various monomers with various radical ends [Odian, 1981]. Specifically, the reactivity ratio of monomer 1, $r_1$, is defined as the ratio of the rate coefficient of the reaction of monomer 1 with the polymer radical ending in monomer 1 to the rate coefficient of the reaction of monomer 1 with the polymer radical ending in monomer 2. Thus, a high value of $r_1$ means that a segment from monomer 1 in the copolymer chain will more likely be linked to another segment from the same monomer. A value of $r_1$ close to zero means that the copolymer chain will more likely have alternating segments of monomers 1 and 2. This is not the entire story, because one has to look at the reactivity ratio for the other monomer, i.e., monomer 2. Finally, this assumes that concentrations of monomers are equal. If not, at least it is well known that reaction rates are linear with monomer concentrations. If one looks at acrylic acid (1)-methyl methacrylate (2) copolymerization, $r_1$=0.33 and $r_2$=2.17. This means that acrylic acid is three times more likely to alternate with methyl methacrylate in the growing copolymer chain, while methyl methacrylate is 2.17 more likely to link up with another methyl methacrylate segment in the growing copolymer chain. Taking both conflicting tendencies into account, there is (0.33)(2.17)=0.72 (or 72%) likelihood for alternating segments of the two monomers, if there is equal concentration of the two monomers. If the ratio of acrylic acid monomer to methyl methacrylate is 0.71, then there is equal likelihood that an alternating and nonalternating sequence will be obtained. However, to assure that 7.2% of the time the series will be a block of methyl methacrylate, a ten-to-one methyl methacrylate-to-acrylic acid monomer charge is desirable.

Figure 6:
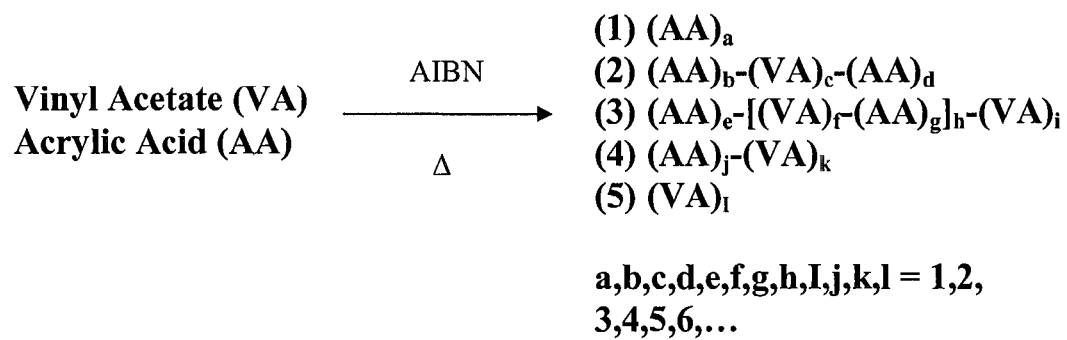
FIG. 6 represents the formation of solid product distribution from VA and AA monomers, where solid polymer is represented by the 5 types of macromolecular species. Initiator (AIBN) fragments are embedded within these macromolecular species.

While chains are growing, new ones are being started and growing chains are also being terminated. The result is a distribution of molecular products, in which the segmental sequences are still based on relative reactivities of monomers with radical ends. For example, when a 50/50 mole/mole monomer mixture of acrylic acid ($r_1$=2.0) and vinyl acetate ($r_1$=0.1) is polymerized with an initiator such as AIBN, reactivity ratios indicate that acrylic acid will be 20 times more likely to polymerize first followed by the vinyl acetate. However, there is a good likelihood that a growing chain of acrylic acid segments will terminate prematurely. Also, when all of the acrylic acid monomers have reacted, a new primary radical could be formed to start a new polymer chain, which would then be made up of mostly vinyl acetate segments. This is depicted in FIG. 6.

The solid product distribution can be dissolved in a common solvent such as THF. Portions can then be precipitated fractionally using cyclohexane as a precipitant. An example fractogram shown in FIG. 7 indicates the approximate locations of various product species types, based on the amount of precipitant added. A fractionalization operation can be carried out in order to produce mostly $(AA)_b$-$(VA)_c$-$(AA)_d$, $(AA)_e$-$[(VA)_f$-$(AA)_g]_h$-$(VA)_i$, and $(AA)_j$-$(VA)_k$, which would exhibit surfactancy properties. The fractionalization can be more focused to produce a relatively high percentage of the $(AA)_j$-$(VA)_k$ material.

Suitable polymer surfactants and methods for maximizing their production using single-stage FRRPP copolymerization are described in U.S. Patent Application Publication Nos. 2003/0153708 and 2005/0250919. These methods take advantage of the combination of phase equilibria and inherent copolymerization kinetics to sequence monomer segments within the polymer chain. Since the tendency of polymer radicals with acrylic acid or methacrylic acid ends is to react with acrylic acid or methacrylic acid monomers, respectively, then in a single-stage copolymerization with a hydrophobic monomer set, multipolymers are formed wherein the acid segments are reacted first as the polymer chain grows, followed by the hydrophobic monomers. If the solvent environment prevents termination reactions, such as in an FRRPP system, then the result is the generation of a surfactant multipolymer tapered block copolymer. For example, a tapered block copolymer of vinyl acetate and acrylic acid (VA-t-AA or $(AA)_e\text{-}[(VA)_f\text{-}(AA)_g]_h\text{-}(VA)_i$; where $h \gg e,i$; $g \gg f$ at low values of h; $f \gg g$ at high values of h) has been produced (called B6-1) and presented in U.S. Patent Application Publication Nos. 2003/0153708 and 2005/0250919. In this copolymer, the AA content was about 6 wt %. At least 98 wt % of the solid product was shown to be incorporated into water as a self-emulsion when the acrylic acid segments were neutralized with ammonia. Molecular weight analysis of the unneutralized B6-1 resulted in a number average molecular weight of 42,000 Daltons with a polydispersity index (weight average molecular weight divided by the number average molecular weight) of 2.76. This brings the system into the moderately broad molecular weight distribution range, since a monodisperse macromolecular system has a polydispersity index very close to 1.0. Therefore, based on the above-mentioned segmental subscripts, $$e+h(f+g)+i=500\text{-}600 \text{(Average)} \quad (5)$$

A molecular representation of the B6-1 material is shown in FIG. 8C, as contrasted with other types of VA-AA copolymers. Even though it is believed to be a tapered block copolymer, as evidenced by thermal analysis results, the other copolymers shown in FIGS. 8A, 8B and 8D can also exhibit surfactancy properties, due to the fact that their hydrophilic AA segments can segregate themselves from the hydrophobic segments in water. Other possible monomers that can be used to produce the structures in FIG. 8 include methacrylic acid (MAA) instead of AA, and acrylates such as, but not limited to, ethyl acrylate (EA), butyl acrylate (BA), 2-ethylhexyl acrylate (2-EHA), octyl acrylate (OA), nonyl acrylate (NA), and decyl acrylate (DA) instead of VA. These alternate monomers are not only thermodynamically but also kinetically feasible substitutes to the VA-AA structures in FIG. 7. Moreover, they can result in more thermally resistant surfactant products compared to the VA-AA macromolecules, due to the hydrolytic stability of the acrylate polymers compared to PVA and the higher glass transition temperature of polymers made from the MAA, compared with polymers made from the AA monomer. During processing in the presence of water and/or alcohol, some of the vinyl acetate segments can be hydrolyzed into vinyl alcohol with the accompanying formation of acetic acid due to the catalytic effect of AA segments. The literature demonstrates that this occurs in the presence of HCl [La Mantia, 1992]. In the case of the VA-t-AA copolymer, the same mechanism is believed to occur due to the formation of acetic acid as well, which is evidenced by the development of a vinegar smell and the deterioration of an equivalent copolymer that contains at least 10 wt % AA groups.

Figure 7:
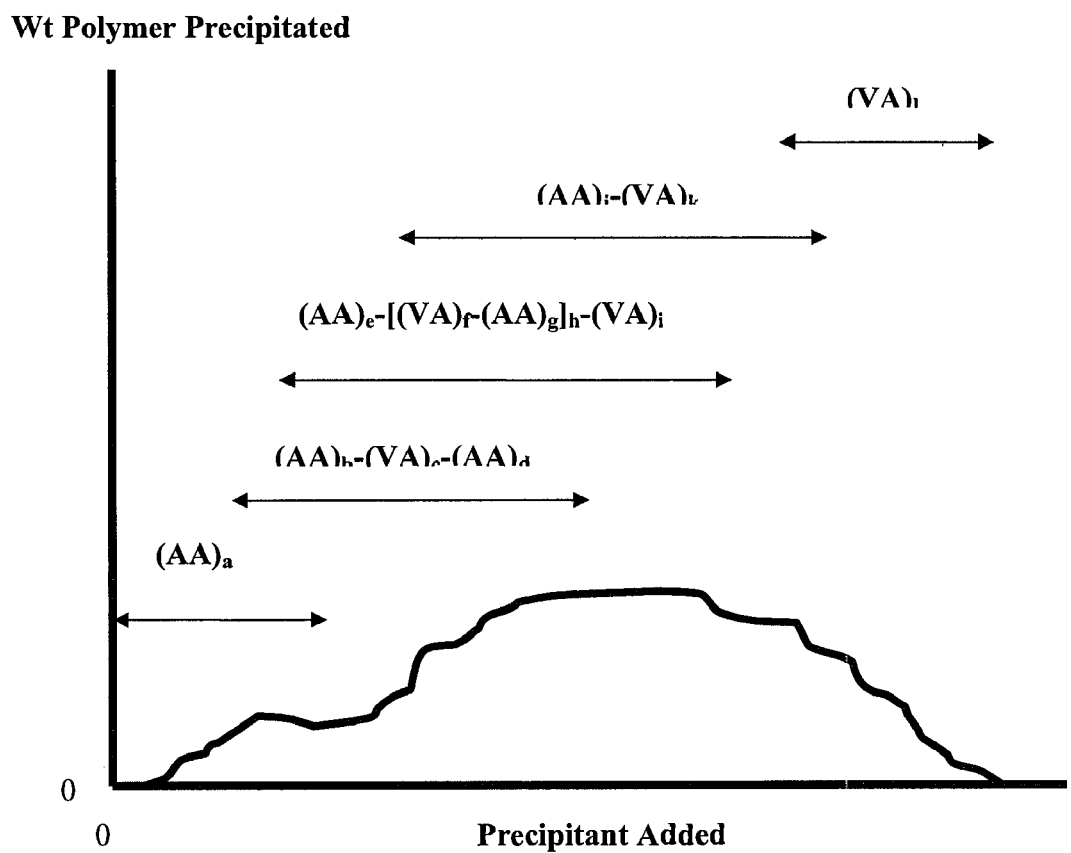
FIG. 7 is a fractional precipitation plot for the separation of components from free radical copolymerization of VA and AA.

The FRRPP process relies on phase separation of the polymerizing species at temperatures above the lower critical solution temperature ("LCST"). It is also possible to produce VA-AA surfactants if phase separation during polymerization is done in a conventional sense, i.e., at temperatures below the upper critical solution temperature, or UCST. This approach is not as efficient as the FRRPP process, but can be implemented in the same way. For example, a single-stage method could be used under a precipitating solvent below the UCST, whereby both monomers are charged into the reactor to produce a product distribution as illustrated in FIGS. 6 and 7. The other approach, which happens in a similar way to the two-stage FRRPP process [Caneba, U.S. Pat. No. 5,173,551] is to produce VA polymer radicals in an environment that precipitates these radicals below the UCST [Stahl et al., 1977]. Acrylic acid monomer is then added in order to produce the block copolymer. Since a conventional free-radical polymerization kinetic is used, all the blocks can also be produced from a mixture of monomers, thus opening the possibility of producing multifunctional surfactants. This approach is a multistage block copolymerization method that depends on maintaining stable polymer radicals. Modern approaches have been formulated which make it possible to exert very good control over the rate of free-radical polymerization at the expense of reduced variety of combined monomeric units that are copolymerized in the various blocks.

Controlled free radical chemistry allows the specific placement of various monomeric units along polymer chains, in order to enhance desired effects in the overall properties of the product multipolymers. For instance, placement of hydrophilic groups on one end of the polymer chain results in a water-dispersible multipolymer, and still allows the hydrophobic groups to intimately interact with oily substances.

Controlled free-radical polymerization chemistry has been proposed to be effected with and without the use of various mediating agents. Feasible methods that use mediating agents include atom transfer reaction processes (ATRP) [Matyjasewski et al., U.S. Pat. No. 5,807,937], reversible addition fragmentation transfer (RAFT) [Lebreton et al., 2002], and nitroxide-mediated free-radical polymerizations [Georges et al., 1993; Odell et al., 1995; Keoshkerian et al., 1995]. In the FRRPP patent [Caneba, 1992], no chemical mediating agents are used, which allowed for a wider variety of monomeric units in the various blocks. In the present invention, a solvent system was chosen in such a way that in the nonreactive equivalent reactor solution, turbidity or increased precipitation is obtained from a clear solution or partially precipitated mixture as the temperature is increased. If this transition occurs at a temperature such as 80° C., then the reactor can be operated at a constant temperature between 70° C. and 200° C., wherein the upper limit can go down preferably to 80° C. to 120° C. In the first stage reactor run, monomers are charged so that the total wt % of monomers is preferably below 20 wt %, although as much as a 50 wt % charge has been shown to be feasible.

Initiator solutions are added to start the reaction, preferably at a concentration between 0.1-1 wt % of the monomers for thermally activated azo or peroxy types, or at even larger concentrations for larger initiator molecules or if one uses a redox initiator mechanism. The size of the initiator molecules can always be compared to the size of the monomer molecules. The rule of thumb of 0.1-1 wt % of monomers is based on almost equal molecular weights between the initiator molecules and monomers. As the initiator molecules used become relatively larger in size, their wt % should proportionately increase. Other considerations for the initiator include its half-life at the operating temperature (1-100 minutes, preferably at 5-20 minutes) and its perfect miscibility in the reactor fluid. The introduction of the initiator into the reactor should preferably occur in 5-30 minutes. After about 5 times the half life of the decomposition of the initiator from the point at which all of it had been introduced in the reactor, conversion data should show an asymptote at conversions below 80% or preferably below 60%, with a molecular weight distribution at a number average preferably between 1,000 and 100,000 Daltons, and a polydispersity index preferably in the range of 1.2 to 3. At this point, the reactor is ready for the next stage. If the molecular weight is high enough and the residual monomer is low enough, then a second set of monomers can be pumped into the reactor along with a second set of solvents and precipitants if needed. The temperature can also be adjusted during the second stage of polymerization. If a substantial amount of polymer radicals remain alive after the second stage, then a third set of monomers, solvents, and precipitants can be added in the reactor, and so forth. If the amount or residual monomer should be reduced, then this can be done by stripping with an inert gas or vacuum or by continuing the controlled propagation reaction through a series of processes comprising rapid cooling, a hold period at low temperature, and rapid heating followed by a hold period at the operating reactor temperature. The rapid cooling step freezes the reaction and the hold period at the low temperature redistributes the monomers close to the radical sites. The subsequent rapid heating step brings the fluid to the operating temperature wherein chain extension occurs. When the residual amount of unreacted monomers is low enough, the second stage addition of the new set of monomers, solvents, and precipitants can commence. Further chain extension and reduction of unreacted amounts of monomers can be effected by a combination of these above-mentioned steps. With this strategy, it is best to first generate live multipolymer radicals that will make up the hydrophobic portion of the surfactant macromolecule. The last set of monomers to be added in should contain those that will produce hydrophilic segments, such as acrylic acids, methacrylic acids, acrylamides, methacrylamides, hydroxyalkyl acrylamides, hydroalkyl methacrylamides, etc. When the desired product is produced, any remaining radicals can be rendered inactive by exposure of the reactor fluid to oxygen from the air, by blowing in air onto the reactor fluid for about one minute. The reactor fluid can then be devolatilized in order to obtain the solid surfactant product, which can be later neutralized to pH=7 and dissolved in water or brine. Alternately, water and neutralizing agent can be added into the hot reactor fluid while volatile organics are removed from the vapor space using direct steam or vacuum. Recovered organics can be reused in the next polymerization run along with make-up reagents. The reactor pot will be left with a relatively high concentration of the surfactant dispersed in hot water. When this mixture cools to room temperature, some of the surfactant can turn into solid; thus, dilution should be done before this happens. If some solid still forms after dilution, then a quick centrifugation or a similar procedure can be employed to separate the liquid surfactant solution from the solid.

Other polymerization chemistries that can be used for the formation of multifunctional polymer surfactant mixtures include ionic (for formation of styrenic, acrylate, methacrylate, olefinic polymers), polycondensation or step-growth (for formation of ester, carbonate, amino, phenolic, formaldehyde, urethane, urea, melamine, epoxide polymers), polyinsertion or coordination (for formation of olefinic and some vinyl polymers), and ring-opening (for formation of silicone, ether, lactone, lactide, anhydride, lactam, cycloalkene, ethylenimine, oxazoline polymers) mechanisms. When using these other mechanisms, precursor polymers or oligomers can be formed with reactive end and/or side groups. Either end and/or side groups can be modified and/or groups can be reacted together in a coupling reaction, which could occur via any possible reaction mechanism. As shown in FIG. 9, groups A and B can couple to form graft or block copolymers via end-group reactions. Examples of end-group reactions include, but are not limited to, carboxylic acid-hydroxy reactions (ester type), amine-isocyanate reactions (urea type), phenol-formaldehyde, isocyanate-hydroxy reactions (urethane type), or combinations of these reactions. As for grafting reactions, various agents have been used to provide reactive side groups. Examples of agents include, but are not limited to, triphenyl phosphate for polyethylene terephthalate and linear polycarbonate, peroxides for polypropylene, or combinations of these agents. Free-radical chemistry can also be used to form precursor oligomers and polymers for the formation of multipolymer surfactant mixtures, in addition to its capability of direct formation of multifunctional surfactants through one of its controlled reaction mechanisms using the widest variety of monomers.

With the variety of functional groups that can be incorporated from the ends and sides of the above-mentioned polymerization procedures, coupling with these products and other polymers made from other chemistries (such as polycondensation, coordination, and ionic chemistries) can be effected. For example, amine end groups of an amide oligomer from a polycondensation reaction can be reacted with carboxylic ends of a multipolymer from an FRRPP procedure. This can also be done with an amine-terminated silicone instead of the amide oligomer. A ring-opening reactive monomer from free-radical chemistry that can be employed is glycidyl methacrylate. Once this monomer is incorporated in the multipolymer chain, its epoxide side group can participate in a host of coupling reactions. In the literature, there are numerous citations of vinyl compounds with various reactive groups that can later participate in coupling reactions after incorporation into multipolymer macromolecules.

The use of interfacially active copolymers is very common in the compatibilization of two immiscible polymer blends. Various functional groups within the interfacial copolymer (also called a compatibilizer) have been used to establish physical and/or chemical [Xantos, 1988] interactions with the two erstwhile immiscible polymer blends. Analogously, the water and oil represent immiscible polymers, and the multifunctional surfactant represents the compatibilizer as depicted in FIG. 4. This means that deviated structures and compositions from the main surfactant molecules produced by the various chemistries outlined can be incorporated in the mixture, producing a continuous composition spectrum of surfactant mixture, and the collection of macromolecules can still be compatible with water or brine. This can be implemented using other chemistries and monomeric components as indicated in paragraphs 76-78. This is an advantage if the deviated structures can enhance other needed functions, such as thickening, demulsification, etc. As an example, which demonstrates the formation of this continuous composition spectrum of surfactant mixture from VA/AA FRRPP polymerization, during the reactor formation of the tapered VA-t-AA block copolymer from the single-stage FRRPP process, mostly unreacted VA would have to be separated and then reused in subsequent reactor runs. In this case, it is better to have the primary objective of polymerizing all unreacted vinyl acetate monomers and small acrylic acid monomers by the addition of a chase initiator toward the end of the run. This practice of chasing an unreacted monomer is prevalent in the paints and coatings industry, in order to avoid having to recover valuable yet potentially hazardous unreacted monomers. Another approach is to combine the methods of producing both tapered block copolymers and random copolymers in the same reactor run. As indicated in Examples 6 and 9 of U.S. Patent Application Publication Nos. 2003/0153708 and 2005/0250919, for the formation of VA-AA copolymers, adding an initiator during the first 20 minutes will produce a tapered block copolymer, while continuously adding an initiator and AA will result in the formation of random copolymers. Continuing to add the initiator and AA beyond 20 minutes will result in the formation of some random copolymers, probably a very small amount of PVA homopolymers, and tapered block copolymers. The other result is an increase in polymer concentration in the reactor (at 29 wt %) as well as overall monomer conversion to polymer (at 82 wt. %) and, due to the formation of a significant amount of VA-AA random copolymer that behaves like a thickener in water, the resulting product is the thickened B6-1VA-AA copolymer. Such advantages are realized in proposed applications of this invention, with the additional benefit of increasing oil recovery performance through thickening, even though a random copolymer was also produced. Hereafter, continuous composition spectrum multifunctional multipolymeric surfactant mixture/s may be referred to simply as surfactant mixture/s.

Polymer Surfactant Demulsifying Properties:

If the multifunctional polymeric surfactant composition is synthesized in an efficient manner and made to contain monomeric, oligomeric and/or polymeric ingredients that provide it with demulsification properties, then the polymer surfactant mixture is reusable in stepped and/or multiple oil/bitumen extraction processes. The result is an oil/bitumen extraction procedure that minimizes the use and wastage of chemicals, especially the multifunctional polymeric surfactants. In conventional recovery processes, oil/bitumen is normally well-dispersed and emulsified within surfactant domains, and addition of a demulsifier or demulsifying environment, such as dilution with impact or raising the temperature, is needed to free the oil/bitumen from the surfactant mixture. In contrast, the multifunctional polymer surfactant mixture of the present invention may be designed to possess demulsification characteristics. This eliminates the need for adding a demulsifier, and also the subsequent need to chemically separate oil from said demulsifier, which is a very difficult separation process, thereby providing effective reuse and recyclability of the surfactant mixture.

Surfactant mixtures with oxygenated hydrophobic groups are particularly desirable for providing polymer surfactant molecules that are reusable within economic limits for successful application to oil recovery. Demulsifying surfactant macromolecules for effective reusability are efficiently built through polymerization methods, particularly through free-radical chemistry, since it offers the widest flexibility in terms of monomer types.

Mobility Control in Subterranean Operations:

In the present invention, the incorporation of more random VA-AA in the formulation containing polymeric surfactant multipolymers has resulted in solutions with much higher viscosities for better mobility control properties. If a fraction of the vinyl acetate segments are hydrolyzed into vinyl alcohol before injection or during service, this should not be construed as detrimental. It is well known that poly(vinyl alcohol) is a good colloidal polymer to stabilize dispersions, and is heavily used as a colloidal stabilizer in suspension polymerization processes [Brooks, 2005]. This additional colloid or thickener could amount to 0 to 40 wt % and preferably 0 to 25 wt % of the total solid comprising the VA-t-AA and colloid. This is well within the composition range of claimed compatible mixtures of poly(vinyl acetate) and acrylic acid-containing copolymers in the patent literature [Kuphal et al., 1992].

The present invention provides polymeric surfactant mixtures with thickening properties, although additional chemically compatible thickeners can be used in conjunction with the polymer surfactants. Although hydroxyl groups may be used as polar groups in the hydro-phobic parts of the surfactants, polar groups other than hydroxyl groups may also be used in the hydrophobic part of the surfactant macromolecules. The surfactant polymers desirably exhibit shear thickening, which is an important contributor to mobility control in oil displacement using high molecular weight polymers.

Thickening water-soluble polymers have been commercially used as mobility control agents in oil field operations. They operate through a flow diversion mechanism, i.e., by reducing flow and fingering of the aqueous phase in high permeability areas to facilitate oil displacement in low permeability zones of the rock matrix. High molecular weight xanthan is a popular example, although a chemically similar example is the statistical copolymer of acrylamide and acrylic acid that is neutralized with sodium hydroxide. Typically, the thickening polymer-water solution is injected into the oil field by itself, or as a trailing slug to water flood or alkali flood and, in various experimental stages, to surfactant flood. In the laboratory, success has been demonstrated when the thickener was injected with the surfactant solution as the so-called sloppy slug. The difference in the formation of the sloppy slug in the present invention is that the surfactant and thickener are produced from the same reactor run, except that the thickener comes from the formation of a more random type of copolymer between VA and AA. This commonality in monomers for both materials assures their compatibility in water. Also, it is well-known that some VA segments would have hydrolyzed to vinyl alcohol segments, rendering more water solubility and even thickening characteristics to the erstwhile VA segments.

Biodegradability:

Biodegradability is a desirable characteristic of a surfactant mixture, as long as it remains active during its time of use. An obvious approach to imparting biodegradability is to use surfactant mixtures derived from natural sources, but such sources tend to be either too expensive, relatively unstable, or not available in large enough quantities. For synthetic biodegradable surfactant mixtures, this restricts the hydrophobic parts to certain chemical groups, such as esters, alcohols and silicones. Vinyl ester segments are notably good examples, because they are stable enough and yet slowly hydrolyze into vinyl alcohols in acidic or basic media. Vinyl alcohol polymers, in turn, have been reported to be biodegradable in the presence of bacteria found in soil ["Concise Encyclopedia of Polymer Science and Engineering", 1990]. Thus, biodegradabilty is enhanced when a surfactant macromolecule contains vinyl ester and vinyl alcohol segments. Since this invention does not rely on sulfonated hydrophilic groups and/or hydrocarbon types of hydrophobic groups, it is possible to design surfactant mixtures that are more environmentally benign compared to conventional ones.

For example, the B6-1 VA-t-AA tapered block copolymer reactor fluid was found to have a pH of 5. Upon drying with heating at temperatures above 60° C., it would exude the smell of acetic acid. This means that some of the vinyl acetate segments are hydrolyzing into vinyl alcohol segments. This phenomenon is also seen during thermal analysis of the sample, in which all second-order thermal transitions are drifting because of the formation of the vinyl alcohol segments after the first heating cycle. The formation of acetic acid has been found to be catalyzed by the acrylic acid segments in the polymer, since VA-AA copolymers with high AA contents (>15 wt %) have been found to turn into a gel with a surface layer emitting a wet acetic acid odor within a matter of days. Upon neutralization of the acetic acid in the fluid and the acrylic acid groups in the polymer, no further change in the polymer was observed. The polymer was rendered effective for years when stored in water, with no further pH change. Based on the pH of 5 for the B6-1 reactor fluid and the fact that the reactor fluid has a 17 wt % solids, one can obtain a maximum vinyl alcohol concentration in the solid polymer that is quite insignificant, at 0.0002 wt %, if no further intentional hydrolysis is carried out. For the B6-1 and thickened B6-1 VA-AA materials, no hydrolysis steps were done, aside from those that naturally occur. Thus, these materials contain vinyl alcohol segments; however, the content is quite low, at 0.0002 wt %.

Oil/Bitumen Recovery from Surface or Subsurface Sources:

Surfactant-based recovery of oil/bitumen from surface/subsurface or excavated tar sands and their tailings, surface/subsurface and excavated shale oil, asphalts, refinery sludges, and surface/subsurface spills or sources is made possible by designing a polymer surfactant mixture that possesses the right combination of properties, such as reasonable cost, good oil/bitumen pick-up performance, demulsification characteristics for reuse, biodegradability, nontoxicity, and simplicity of application. Unlike subterranean applications, the economics of oil recovery from surface oil sources, such as tar sands and their tailings, asphalts, shale oil, and surface spills, is normally not very attractive. However, appropriately designed polymeric surfactant mixtures like those described herein can be used to realize economic and even environmental benefits. For example, polymeric surfactant mixture types of the present invention can facilitate in situ recovery of both light and heavy crude oils because they can concentrate heavier bitumen components, which might contain valuable metals, such as vanadium or nickel, at the surface of the solid phase of the surface oil sources during an extraction, as described in Example 2, below. In tar sands and tailings or shale oil recovery, surfactant mixture flooding can supplement steam or hot water-assisted recovery operations, either in alternating fashion or as a combined injection fluid to effect a higher oil recovery. In addition, the demulsifying capabilities of the surfactant mixtures allow for re-use of the surfactant mixture, and biodegradability renders them particularly well suited for use in oil/bitumen recovery from surface spills and other sources.

A related use of polymeric surfactant mixtures described herein is the clean-up of relatively heavy and/or polar contaminants from the soil. Examples of such contaminants include chlorinated hydrocarbons and MTBE, which have leaked from seals in underground storage tanks. Polymeric surfactant mixtures with polar and biodegradable hydrophobic groups are desirable for these applications. In addition, a polymeric hydrophilic group is desirable to assist in the dispersion of the entire surfactant macromolecule in water. The presence of polymeric surfactant macromolecules facilitates the pick-up of relatively heavy and/or polar soil contaminants. Optimally, oligomeric-sized surfactants may also be included in the formulation that help to decrease the interfacial tension of the system, since this will provide the same effect of having a relatively broad molecular weight distribution.

In addition to facilitating the recovery of metals from surface oil sources and contaminations, the polymer surfactant mixtures may be used to remove unwanted compounds, such as sulfur, from contaminated soil and/or other oil/bitumen sources or supplies, as shown in Example 6.

VOC Loss Control:

VOC losses from crude oil occur during storage and transportation. In order to mitigate this occurrence in an environmentally responsible and convenient manner, one can employ water-based foams comprising foamed polymer surfactants on liquid crude oil surfaces. For example, these liquid foams could be applied continuously above crude oil surfaces especially during venting periods. The foam can also be applied onto leaky fittings when practical. The reduction of VOC loss results from the increase in diffusional mass transfer resistance on the vapor space above the liquid inside a vented tank, for example. A simple calculation can be made of the effectiveness of this method based on the approximation that the time scale for diffusion, $t_D(sec)$, is related to the diffusivity, $D(cm^2/sec)$, and diffusion thickness, $l(cm)$, by $$t_D \approx l^2/D \tag{7}$$

At room temperature and atmospheric pressure, gas diffusivities have been known to be on the order of $10^{-3}$-$10^{-1}$ cm$^2$/sec [Bird, R. B.; Stewart, W. E.; Lightfoot, E. N.; "Transport Phenomena", John Wiley and Sons, New York, 1960, pp. 505-518]. For a diffusion distance (vapor clearance space) of 30 cm, $t_D$ is equal to $9 \times 10^4$-$9 \times 10^6$ sec (1-104 days). This means that a significant amount of liquid would have vaporized in 1-104 days. If 10 cm of this vapor layer is continuously covered with foam, the foam layer would have a diffusivity of $10^{-4}$-$10^{-6}$ cm$^2$/sec (or an average of $10^{-5}$ cm$^2$/sec), since the lower limit of liquid diffusivities is on the order of $10^{-6}$ cm$^2$/sec. If one uses the series resistance representation for the foam and remaining vapor layer, the result is that the effective diffusivity of the composite 30-cm layer becomes approximately equal to $3 \times 10^{-5}$ cm$^2$/sec. In turn, using Equation 2, the diffusion time scale becomes equal to $3 \times 10^7$ sec. This is at least a 33-fold increase compared to the vapor space without foam. Although this calculation provides only an approximation, it shows that dramatic improvements can be obtained in the actual system, as shown in Example 7.

Importantly, because conventional surfactants will remain emulsified in the oil in the absence of a demulsifier, they cannot per se be used to form a covering film for a long enough period of time to control any VOC loss.

EXAMPLE 1

Fractional Precipitation of Thickened B6-1 Surfactant Mixture

This example illustrates molecular differences between the B6-1 VA-t-AA and thickened B6-1, which is a combination of VA-t-AA and random VA-AA with relatively high VA content. This is shown clearly below:

Thickened B6-1=B6-1 VA-t-AA+Random VA-AA
with relatively high VA content (8)

(~75 wt %) (~25 wt %)

From a performance standpoint, the additional 25 wt % of the random VA-AA copolymer can have dramatic effects compared to the base B6-1 VA-t-AA copolymer, as shown in Examples 3 and 4, below.

The fractional precipitation of the B6-1 thickened with the VA-AA copolymer provides a glimpse of the level of compatibility that can be achieved for the mixture. A 1-g quantity of the solid was dissolved in 100 g THF. The mixture was placed on a magnetic stirrer mixer and mixed with a stirrer bar. When the solid was completely dissolved, precipitant cyclohexane was added in drop by drop in roughly equal amounts in order to obtain certain amounts of precipitant. The result in FIG. 9 shows, for the most part, a unimodal distribution. There is a very small, wide peak below 50 ml of precipitant added, which is in the vicinity of a high-AA-content random copolymer. When higher values of cyclohexane are added, precipitants have been found to contain more VA content copolymers. In extreme cases, the precipitants are almost homopolymers. The almost unimodal fractional precipitate distribution indicates that very good compatibility was obtained from the polymerization procedure, especially with the strong intermolecular interactions between segments in the polymer mixture. Also, the long tail indicates a substantial amount of high-VA-content random copolymer, which amounts to at least 25 wt % of the total weight of the solid.

EXAMPLE 2

Extraction of Heavy Crude Oil from Standard Sand

To demonstrate the capability of a multifunctional polymeric surfactant to remove heavy crude oil from sand, 1 part oil per 10 parts sand by weight was prepared. A particular type of sand (MI 2NS) was selected and dried by direct heat from a hot plate surface. The dried MI 2NS sand was passed through a 20-mesh screen for final sizing and air-tight storage. Before use, the stored sand was placed on a plastic pan up to ½-inch in height and re-dried using a microwave oven for about 2 minutes, with mechanical mixing every 30 seconds. A given weight of the microwaved sand was placed in a bottle along with the heavy crude oil (1 part by weight of heavy crude oil for 10 parts by weight of sand). The oil was distributed in the sand using a mechanical mixer for about 5 minutes at a mixing speed of about 100-500 rpm. Finally, the oil mixed with the sand was sealed in the bottle to be later used for extraction experiments.

Oil extraction was begun by placing 10.0±0.1 g of the oil/sand material in a standard 25-ml graduated cylinder (Cat. No. 08-549-17B, obtained from Fisher Scientific, Inc.). Then, 7.0±0.1 g of extracting aqueous solution was added. The solid-fluid mixture was then agitated using a mixer and mixing blade at constant speed for a given period of time. The extracting solution was made up of an ammonia-neutralized vinyl acetate-acrylic acid tapered block copolymer in water as described in U.S. Patent Application Publication Nos. 2003/0153708 and 2005/0250919. More specifically, the tapered block copolymer was B6-1, which means that it nominally contained 6 wt % acrylic acid and it was synthesized using an almost straight batch reaction procedure. Its typical number-average molecular weight was 42,000 Daltons, with a polydispersity index of 2.76. The B6-1 solid was at least 98 wt % active.

The level and manner of mixing the oil/sand and extracting solution were maintained equal for all samples at different mixing times. After mixing, the mixtures would form three phases if allowed to stand for at least 12 hrs: 1) a sand pack (i.e., "solid" phase) phase at the bottom; 2) a cloudy aqueous phase above it; and 3) a thin black oily phase on top. In addition, the sand pack contains a black oil/sand layer on its top surface. This top layer was found to come from oily agglomerates that formed during the mixing process, which were prevented by the surfactant from growing to more than about 1 mm in size. This layer was found to be uniformly spread on top of the sand pack. Thus, the oily/sand layer was transferred into a sealed bottle using a small scoop along with some wash water. Crude oil from the topmost layer, oil/sand scoop, and transfer bottle was harvested using a pre-weighed, oil-soaked soie paintbrush for oil-based paints. Since oily material was found around the mixing blade after each use, a parallel conditioning run using the same procedure and operating variables was always done in order to establish the amount of oil that was subtracted from the total oil recovered in the actual subsequent run.

Most of the oil that settled with sand on the top of the sand pack was extracted by heating it with water. This oily fraction also had a higher density than the rest of the crude oil, indicating the possible presence of heavy metals, such as vanadium, nickel, etc., or sulfur. For example, in at least some instances, the extracted oily fraction would comprise crude residuum. The heavier oily material indicates a portion that is complexed with heavy metals and sulfur.

The result of this extraction work is shown in Table 2, below.

Table 2. Result of extraction of heavy oil from standard MI 2NS sand. Error in % recovery was ±5.5%.

TABLE 2

| Mixing Time, min:sec | % Oil Recovery from top liquid layer and from top of sand pack (in parenthesis) | |
|---|---|---|
| | 0.25 wt % B6-1 Surfactant in Water | 0.5 wt % B6-1 Surfactant in Water |
| 2:00 ± 0:05 | 0 (0) | 22 (5.5) |
| 5 ± 0:05 | 5.5 (22.5) | 33 (33) |
| 10 ± 0:05 | 33 (33) | 44 (44) |

Based on the above results, it is possible to obtain almost 100% recovery using a high enough level of polymer surfactant combined with mixing for a long enough time. Also, in well-mixed and/or well-dispersed systems, a 50/50 proportion of oil from the top liquid layer and oil from the top of the sand pack was obtained. This is not surprising since it is well known that half of heavy crude can contain residuum material. The use of a good polymeric surfactant allowed the separation of this heavy oil material, which can be further refined to separate more of the oil from heavy metals and sulfur. To demonstrate the recyclability of the surfactant used, cloudy aqueous solutions were gathered from similar experiments and they were all shown to be almost as cloudy as fresh surfactant/water mixtures.

Figure 10:
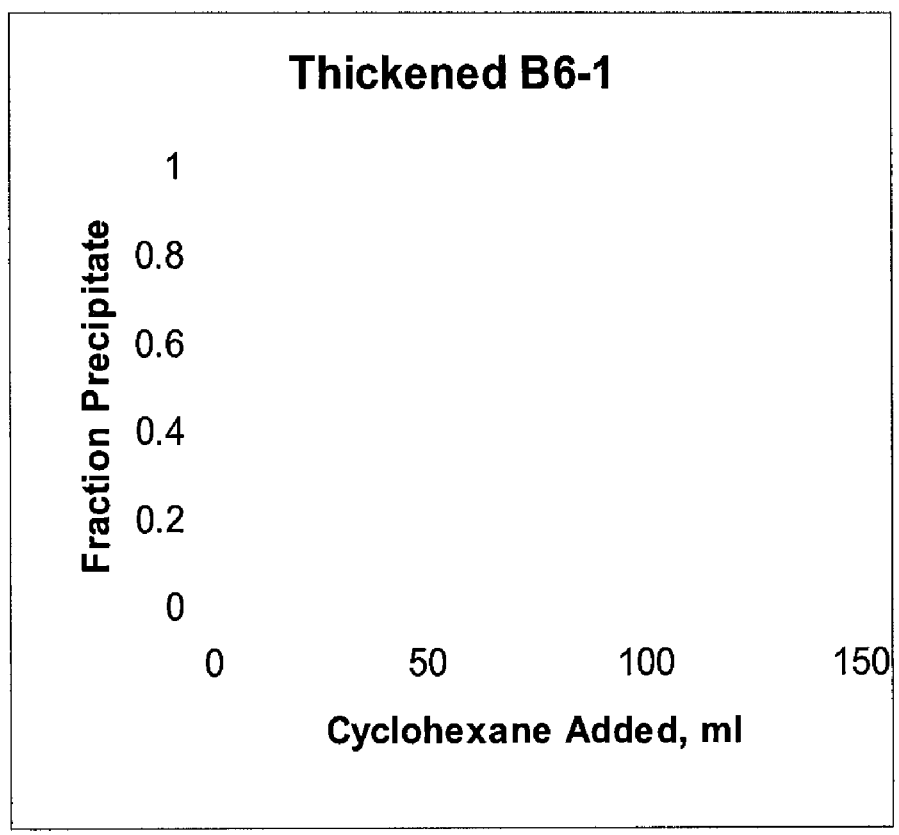
FIG. 10 is a fractional precipitation plot of the thickened B6-1 VA-AA surfactant mixture using THF as solvent and cyclohexane as precipitant.

In order to implement this experiment efficiently in the field (FIG. 10A), a take-up mechanical system is used to transfer contaminated soil or sand (surface or subsurface oil/bitumen or other fossil-based material sources) into a solid-fluid mixer system (Mixer 1) whereby contact with an aqueous liquid containing the polymer surfactant occurs. After separation of the oil phase, the aqueous phase, and the solid phase, oil from the top oil phase is skimmed off, while any oil remaining in the aqueous phase (200) can be purified using a gravity or centrifugal separator, or similar device. The aqueous surfactant-containing fluid (210) coming out of the separator can be reused by pumping it back into Mixer 1. The top layer of the sand or soil (212) is then skimmed off and can be further processed, preferably using heat to recover residuum and even heavy metal complexes. The rest of the soil or sand (202) can undergo a final wash in a Mixer 2/Separator before discharge (206), and the wash water (208) can be recycled into the system. Finally, the washed sand or soil (206) is dumped in an appropriate place. To implement these steps more efficiently, augers can be used as mixers, since they move soil or sand in one direction and fluids move in the opposite direction by gravity. Still another approach is to use hot surfactant and water (into Mixer 1 and/or Mixer 2) in order to introduce heat into the mixer(s) for more efficient cleanup. This approach, shown in FIG. 10A, is a portable version, because it involves a relatively small processing time. FIG. 10B shows a longer-processing-time, stationary version of the oil recovery process, which is less energy intensive, since it relies on a clarifier or a gravity settler to separate all the component phases.

EXAMPLE 3

Tar Sands Studies

Tar sand from the Ft. McMurray (Alberta, Canada) Duty Free Shop was used in the experiment. This sand contains a heavy type of bitumen, 15 wt % of which is dropped in the sand. Some 100-g quantities of the tar sand were placed in cylindrical glass bottles. Then, 100 g of either pure tap water or 0.5 wt % ammonia-neutralized B6-1 VA-t-AA copolymer in tap water was added in. The solid-fluid mixture of sand and aqueous fluid inside the bottles was conditioned at operating temperatures (60° C. or 80° C.) inside a Blue M natural convection oven for at least 1 hr. Each of the bottles was then opened and placed in a sand bath at the operating temperature. The sand was mixed using an electric wire beater mixer (lowest setting) for 5 or 15 minutes. The bitumen that floated to the top of the aqueous layer was harvested using a pre-weighed soie brush, and excess bitumen was placed in a pre-weighed cup. Results of the experiment are shown in Table 3 below.

Table 3. Results of % recovery of bitumen from tar sands during open cup mixing at various temperatures and mixing times. The bitumen recovered was on top of the aqueous phase.

TABLE 3

| T, ° C. (Mixing Time) | Water | 0.5 wt % B6-1 Ammonia-Neutralized VA-t-AA |
|---|---|---|
| 60 (5 min) | 0.6 ± 0.5% | 6 ± 2% |
| 60 (15 min) | No data taken | 9 ± 2% |
| 80 (15 min) | No data taken | 19 ± 2% |

Table 3 shows a dramatic improvement in the recovery of bitumen from the polymer surfactant-water system, compared to the system of using water alone.

In an experiment conducted at 80° C. with 15 minutes mixing time, a bitumen layer removed from the top surface of the sand and a bitumen layer removed from below this top layer were harvested and extracted with THF. Vanadium contents were obtained from these two bitumen samples and from the tar sand source itself. For the tar sand, bitumen was also extracted by repeated washings of THF followed by drying of the THF from the wash fluids. One-gram amounts of bitumen from the three samples were placed into ceramic crucibles. They were gradually heated at 10° C./min to 700° C., and the temperature was maintained for 1 hr. Residues from the crucibles were transferred to a beaker and dissolved in 40-50 ml 60/40 v/v concentrated HCl/HNO$_3$. Resulting solutions were diluted with deionized water to 250 ml for Inductively Coupled Plasma (ICP) Spectrometer analysis. Results indicate that the starting tar sand had 121 ppm vanadium, the bitumen layer from the top of the sand had 255 ppm vanadium, and the bitumen layer from a lower portion of the tar sand after mixing had only 171 ppm vanadium. Therefore, the surfactant-water system is also capable of concentrating vanadium in the bitumen on top of the sand layer after mixing.

An experimental study to simulate in situ tar sand extraction was done using the apparatus shown in FIG. 11. A piping with ¾" diameter and 4" internal dimension (602) was fitted with flanges that end with ⅛" female NPT connections. The piping was loaded and packed with the Fort McMurray tar sand and closed with screens on both ends. Upstream is a ⅛" Copper refrigerant coil (614). Since the coil and tar sand packed column were inside the natural convection Blue M oven, the coil had the function of an aqueous phase preheater. Before the fluid entered the oven, it was metered in by a stainless steel 50-ml syringe (604) that was driven by a syringe pump. Inlet pressure was measured using the gauge (608), and outlet from the tar sand packed column was obtained at atmospheric pressure using the collector (606). For the tar sand that was found to contain 15 wt % heavy bitumen, around 52-53 g of tar sand was packed into the column, with a pore volume of around 10 ml. With a flow rate of 3.64 ml/min of water, only 0.08 g of bitumen was extracted at an oven temperature of 80° C. using 50 ml of water. When 50 ml of thickened B6-1 was used, around 0.49 g of bitumen was extracted under the same set of conditions (except the pressure gauge read around 10 psig when using the surfactant-water while it read close to zero psig when using pure water). This means that using 5 pore volumes, the thickened surfactant-water fluid was capable of extracting 6 times more bitumen than could be extracted using water alone. Using higher-grade tar sand and operating close to 100° C., higher levels of bitumen extraction from the production outflow site can be obtained for the in situ operation.

EXAMPLE 4

Sandpack Oil Recovery Studies

Figure 12:
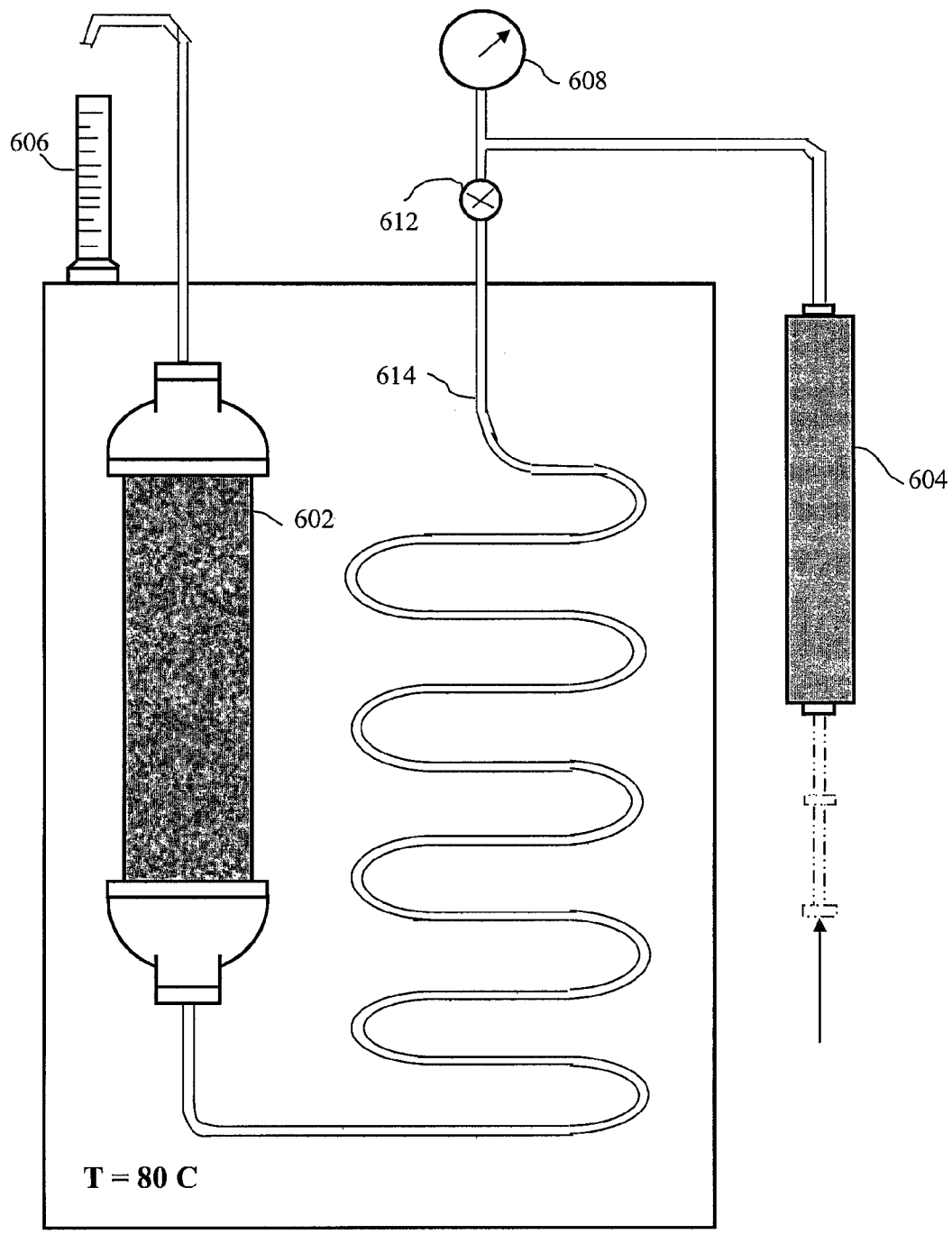
FIG. 12 is the apparatus set-up for in situ tar sands recovery.

Flow displacement of oil through a sandpack or sand column is relevant to enhanced oil recovery in subterranean sources. An experimental apparatus set-up shown in FIG. 12 was used to experimentally simulate the displacement of oil from an oil field, in accordance with accepted procedure. A pressure drop between the top of the fluid on the sand column at atmospheric pressure and a partial vacuum at the bottom of the column was the driving force for fluid motion.

About 60 ml of 20-mesh passed MI 2NS sand was packed into a cylindrical column that was mounted on a Buckner funnel. A coarse filter paper was used to hold the sandpack onto the Buckner funnel. To fill the pores with water, the vacuum was turned on and 48 ml of water was placed on the top of the sandpack. Just before the water level dropped to the top surface of the sandpack, 48 ml of Fuel Oil #2 was poured slowly on the water. The filtrate flow rate of about one drop per second was maintained by controlling the power from the vacuum. When the oil level dropped down to the top of the sandpack, the 250-ml Erlenmeyer flask was replaced by an empty flask and 48 ml of secondary recovery water was slowly poured onto the sandpack. After this primary-plus-secondary recovery, the water level dropped to the top of the sandpack, and the oil recovered inside the Erlenmeyer flask was measured. At this point, the water-to-oil ratio ("WOR") was found to be about 50. Tertiary recovery fluid was then slowly poured onto the top surface of the sandpack. Once again, the oil recovered from the collector container was measured. Recovered Fuel Oil #2 was measured gravimetrically or volumetrically. For small amounts recovered, an EPDM (Ethylene-Propylene-Diene Monomer) absorbent foam was used, which was found to preferentially absorb the Fuel Oil #2 completely from water or water-surfactant within the margin of error of the weighing device of ±0.1 g. Results are shown in Table 4.

Table 4. Improvement of surfactant/water displacement of Fuel Oil #2 from Oil-Originally-in-Place ("OOIP") in a Sandpack.

TABLE 4

Tertiary Surfactant Used Ratio of Vol. (ml) Primary +Secondary Ratio of Wt % in Water after Oil-to-OOIP, Tertiary Oil-Run # Type Water Vol. Used, ml Surfactant g/g to-OOIP, g/g 1 None (Water) 0 48 0 0.41 0.15 2 NH.sub.3-Neutr. 0.5 48 0 0.54 0.17 B6-1 3 Thickened 0.5 20 28 0.41 0.41 NH.sub.3-Neutr. B6-1 4 Thickened 0.5 20 28 0.57 0.39 NH.sub.3-Neutr. B6-1 3 Thickened 0.1 48 0 0.58 0.08 NH.sub.3-Neutr. B6-1 4 Thickened 0.5 10 38 0.41 0.21 NH.sub.3-Neutr. B6-1 5 Thickened 0.5 10 38 0.53 0.17 NH.sub.3-Neutr. B6-1 6 Reused from .apprxeq.0.2 48 0 0.68 0.14 Runs #3 and #4

It is evident from Table 4 that some tertiary oil can be recovered using the multifunctional, multipolymeric surfactant solution of the present invention. Thickened surfactant, earlier referred to as "continuous composition spectrum surfactant-thickener mixture", has been found to recover the greatest amount of tertiary oil based on OOIP levels (Runs #3 and #4), at 0.39% and 0.41% OOIP, respectively. Also, unthickened surfactant (Run #2) showed marginal increase in performance compared to that of water (Run #1) in the tertiary recovery. Results of Run #6 demonstrate that re-used surfactant/thickener mixtures from Runs #3 and #4 showed expected performance, considering that their concentration dropped to almost 0.2 wt % in water.

Figure 13:
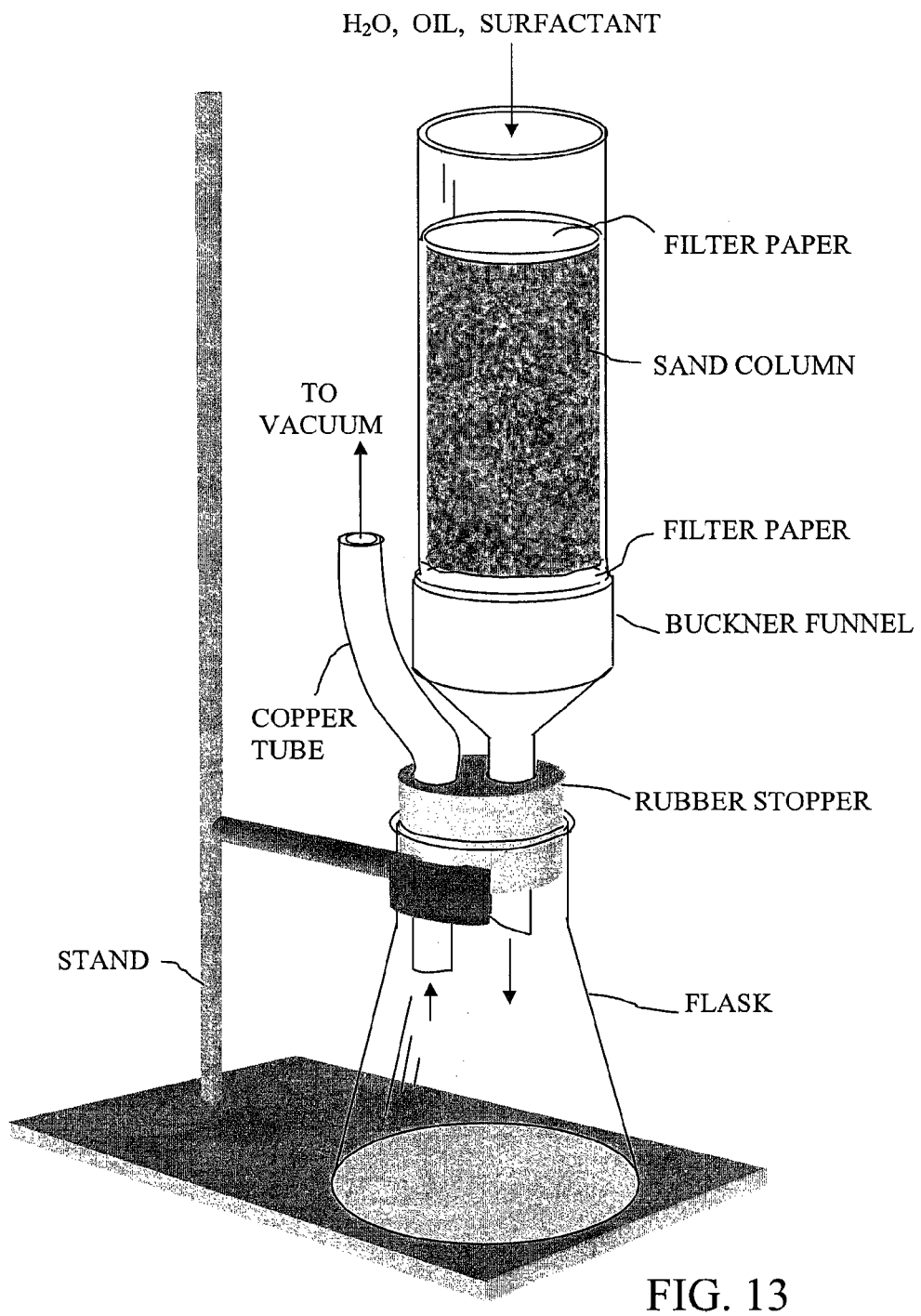
FIG. 13 is the apparatus set-up for sandpack oil recovery.

In oil field situations (FIG. 13), the height of the sandpack represents the distance between the injection and production wells. The pressure drop between the top surface of the sandpack and the vacuum pressure in the receiving flask corresponds to the pressure drop between the injection and production wells. About two pore volumes of thickened $NH_3$-neutralized B6-1 surfactant in water or brine at 0.5 wt % solid surfactant slug (402) would be pumped into the injection well at constant pressure, followed by driving water or brine slug (410). This operation can be implemented in either secondary, tertiary, or quartemary phases of oil recovery. Produced oil, surfactant, and thickener in brine (406) can be separated using a gravity or centrifugal separator, or a similar device. If the rate of recovery of surfactant in brine is relatively fast, then either a hydrocyclone or a continuous centrifuge is recommended. Otherwise, clarifiers or gravity settlers will suffice. Recycled surfactant in brine (408) can be re-thickened by adding make-up, extra-thickened, $NH_3$-neutralized B6-1 in water or brine at about 2.5 wt % solid polymer content. Extra thickening properties can also be imparted in regularly thickened versions by adding some $NH_3$-neutralized VA-AA random copolymer into the mixer. The addition of streams into the mixer is monitored based on the attainment of a particular value of the interfacial tension of the fluid that is pumped into the injection well. A spinning drop apparatus can be used to determine the interfacial tension, while a Brookefield, Fann, or capillary viscometer can be used to determine the viscosity. Alternately, or in conjunction with this operation, similar sandpack oil and/or core displacement experiments can be performed. Part of the aqueous phase that is recovered from the gravity or centrifugal separator (408) can be recycled, while the rest can be desalted by evaporation or precipitation in order to produce processed brine, which will likely be almost free of surfactant/thickener. The processed brine can be fed back into the mixer before injection into the well, if needed.

EXAMPLE 5

Core Rock Study

A 1-inch-diameter, 2-inch-long cylinder of porous Berea rock (9±1 ml pore volume and porosity of 100-200 mD) was used to simulate displacement of oil from a subterranean source. The core was held by a Temco (Temco, Inc., Tulsa, Okla.) RCHR-Series Hassler-type core holder with an over-bearing pressure of 130-150 psig of a hydraulic fluid. The operation was done at room temperature of 16° C. and fluids were introduced through the core using a high pressure syringe pump (Cole-Parmer, Inc.). For a pump setting of 5.5 ml/min, 40 ml of tap water was injected into the core, i.e., sweep of at least 3× pore volume. Then, for a pump setting of 0.34 ml/min, 2 pore volumes (18 ml) of Citgo light crude oil was passed through the core and the core pressure went up to 65-60 psig. Subsequently, water-flooding was done to simulate secondary recovery at a water flow rate of 0.34 ml/min for two pore volume passes of water (18 ml). After this secondary recovery, 2.82 g of oil was obtained in the collector. Tertiary water-flooding was done by passing through three pore volumes of water (27 ml) and the pressure went up to only 50-65 psig. At the end of this water-flooding tertiary recovery mode, only 0.165 g of oil was obtained in the collector. To recover more of the oil still trapped in the core, one pore volume (9 ml) slug of a 0.5 wt % B6-1 VA-t-AA multifunctional polymer surfactant in water was used for enhanced tertiary recovery (the pressure went up to 110 psig) followed by two pore volume slugs of water. During this enhanced recovery, 0.45 g of oil was collected and the produced water phase was still cloudy with the presence of the surfactant. For the oil specific gravity of 0.83, the total recovery of 3.435 g of oil corresponds to 4.14 ml. Since one pore volume corresponds to 9±1 ml, this means that the core was at least 46-52% saturated with oil before secondary water flooding. Nevertheless, this example run demonstrates that the B6-1 Va-t-AA multifunctional multipolymeric surfactant was capable of delivering at least three times the amount of oil compared to that of tertiary recovery water flooding. More oil would have been produced if the thickened B6-1 VA-AA multifunctional, multipolymeric surfactant had been used, as seen from Example 4, to an additional amount of about 0.45 g. However, the pressure almost doubled when the B6-1 VA-t-AA surfactant alone was used; using the thickened version would have tripled or quadrupled the operating pressure. Thus, in a oil field operation, it may be desirable to start with a slug of the B6-1 VA-t-AA surfactant or its equivalent in order to observe how the pressure increases. If it is manageable to increase the pressure further, a small slug (0.1 pore volume) of a thickened B6-1 VA-AA surfactant or its equivalent can be injected. If the pressure is still manageable, a bigger slug can be injected, followed by water, and so forth. Alternately, small slugs of the surfactants can be used with water slugs in the intervening periods. Of course, other additives can be introduced, such as more thickeners in the water, alkali agents, etc., although they are not required.

From a process standpoint, water-flooding with a surfactant is a relatively simple operation if secondary and/or tertiary water-flooding has already been implemented in the oil field operation. One merely incorporates surfactants into the aqueous phase and pumps in the needed amount followed by a water slug. Even if two types of multifunctional, multipolymeric surfactants are used (e.g., unthickened followed by thickened type), such an approach is very different from foam-flooding, wherein a gas has to be introduced after the surfactant-water slug, followed by a water-based slug of either pure water or viscous polymer in water. The latter operation requires a carbon dioxide or nitrogen gas source as well as the necessary infrastructure. As seen from the total oil recovered in this example, the use of the multifunctional, multipolymeric surfactant alone was able to recover most of the remaining oil at a rate several times that of tertiary water-flooding. This example demonstrates that foam-flooding, or even gas-flooding, is not necessary when multifunctional, multipolymeric surfactants are used to displace oil from a subterranean source.

EXAMPLE 6

Sulfur Removal Study

Certain crude/bitumen sources contain substantial amounts of sulfur in various forms. Fortunately, the multifunctional, multipolymeric surfactants discussed herein can be designed to interact well with various sulfur compounds. In this experiment, crude oil contamination from Pertolia, Ontario, was used as the source of sulfur. A 50 g quantity of sulfur-laden, crude-contaminated soil from Petrolia was mixed with the B6-1 VA-t-AA surfactant at 80° C. for 10 minutes. A reduction of the sulfur odor was observed. Then, 50 g of water was added and the mixing proceeded for 5 more minutes. Sulfur in the aqueous fluid was initially detected by observing its reduced pH (5-6). To further analyze for possible sulfur extraction, the aqueous fluid was dried, and then partially dissolved in 50/50 v/v $CH_2Cl_2$ and acetone. A light brown liquid was obtained, indicating the presence of sulfur. A small part of the solution was then injected into a gas chromatograph/mass spectrometer (GC/MS), and the spectrograph was analyzed using a ChemStation software. Aside from the obvious presence of the $CH_2Cl_2$ and acetone in the peaks, another peak was observed which corresponds to one of the below-listed sulfur-containing compounds with the following likelihoods:
1. $CH_3SH$—40-50% likelihood;
2. $C_4H_4S$—20-30% likelihood;
3. $C_2H_2N_2S$—20-30% likelihood;

leading to the reasonable conclusion that sulfur was detected in the GC/MS peak.

In an actual process operation, the sulfur contamination source or supply would be mixed with the aqueous solution of the multifunctional, multipolymeric surfactant with or without the addition of heat. If an acidic pH were detected, then the fluid could be neutralized with a base that would precipitate (naturally or by the use of a centrifuge or an equivalent mechanical device) some the sulfur, such as lime. The precipitate could then be separated from the aqueous phase, and the aqueous phase reused.

EXAMPLE 7

VOC Loss Control for Gasoline/Crude Oil

To simulate the capability of a foaming surfactant in reducing VOC losses from crude oil, gasoline was used because it has a chemical make-up similar to that of crude oil. The high volatility of gasoline also allows the experiment to yield meaningful results in a relatively short period of time. In order to determine the evaporation loss of gasoline, 20 ml was placed in a 25-ml graduated cylinder and allowed to stand. To compare its performance with a foamed polymer surfactant, a parallel cylinder system was used. The 0.5 wt % $NH_3$-neutralized B6-1 foaming surfactant solution in water was saturated with gasoline by mixing them together in a vessel and allowing them to stand for at least one hour. The resulting saturated surfactant solution settled to the bottom and was transferred to another container. Foam was produced by blowing air though the saturated surfactant solution, and the foam was made to settle onto the gasoline surface of the parallel cylinder. In time, the foam would collapse into a liquid surfactant solution, which easily made its way below the gasoline layer. This bottom surfactant/water layer was continually removed, re-formed into new foam, and re-applied to the gasoline surface. It was observed that the turbidity of gasoline never changed during the time of exposure to the surfactant/water phase, indicating that the chemical makeup of the surfactant prevented it from dissolving into the gasoline. This was also evident even when the gasoline was substituted with crude oil.

For atmospheric conditions of 19.5° C. at 65% relative humidity (based on a 14° F. dry bulb temperature), VOC loss reduction of 50% was obtained when the foam was replenished every 0.5-1 hr. At a lower replenishment rate of every 1-2 hrs, only a 12.5% VOC loss reduction loss was obtained. It was evident that the higher foam replenishment rate of every 0.5-1 hr resulted in a higher average foam thickness (about 2 cm, compared to about 0.5 cm for a 1- to 2-hr. foam replenishment time). The nonlinearity of the replenishment time (or average foam layer thickness) makes some sense in view of the prediction from Equation 2, which indicates that the diffusion time scales with the square of the thickness of the foam layer. Thus, doubling the foam layer thickness actually quadruples the diffusion time, and hence the VOC loss reduction.

In practical situations, to reduce VOC losses from crude oil tanks (FIG. 14), a closed foam generating/recycling system can be installed. The aqueous liquid used in foam generation would be removed from a bottom collector of the tank using a pump; passed through tubes that contain packing material (used to generate fluid stresses for foam formation) along with nitrogen gas, carbon dioxide, or the like as a foam generator; and discharged to the top of the tank by several means through a manifold of tubes, perforated plates, spray system, or the like. For a group of tanks, a system of scheduled application of the foam could be used. Note that only about 2 cm of consistent foam layer are needed to realize about a 50% reduction of VOC losses, as shown in the above-mentioned experimental results. The same foam layer thickness can be applied to the practical system, as indicated in Equation 2. In practice, it is possible to maintain 6 cm or more of foam layer thickness, which will have a safety factor of 3. Also, the replenishment time will be longer, since crude oil has a much higher viscosity, but almost the same density as gasoline.

Figure 14:
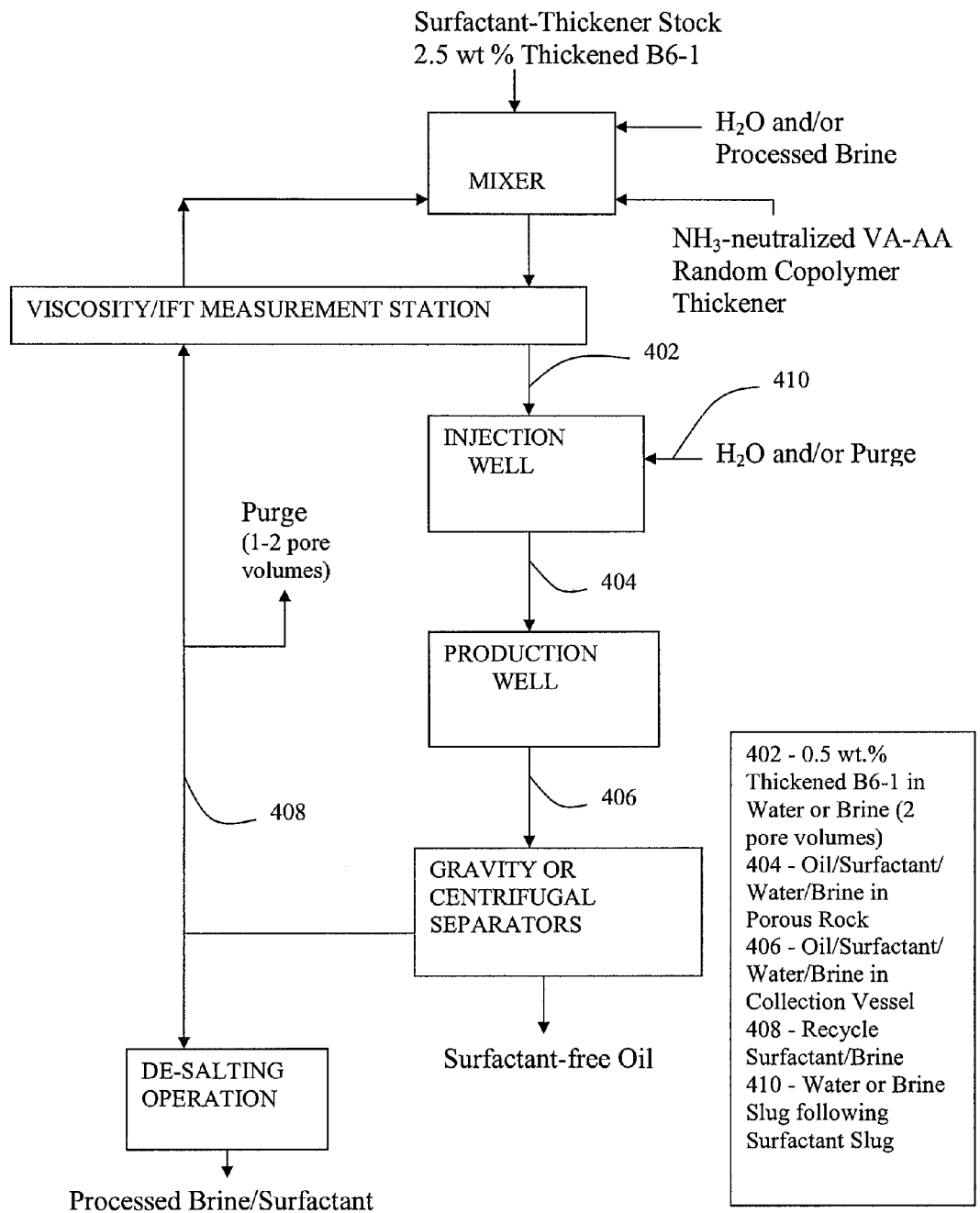
FIG. 14 is a flow chart of application of the polymer surfactants of the present invention to oil recovery from subterranean sources. In all cases, the B6-1 was neutralized before injection.
Figure 15:
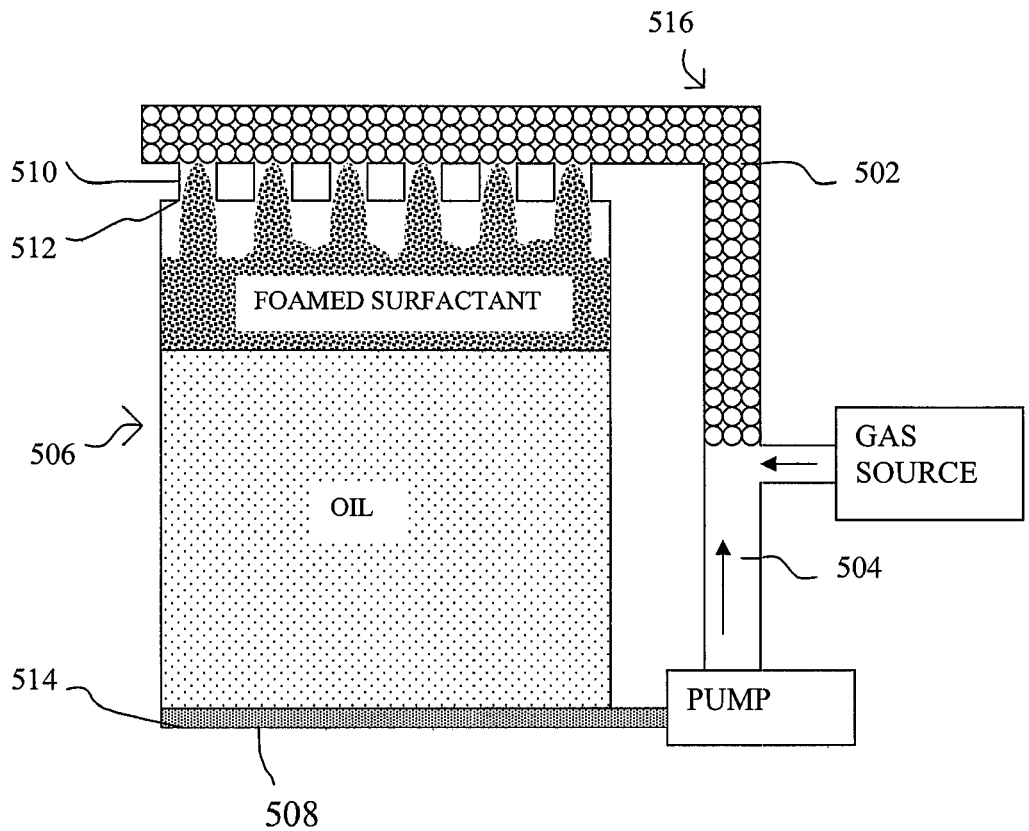
FIG. 15 is VOC loss control operation on an oil storage tank using the foamed surfactant of the present invention.

Referring to FIG. 14, an oil tank (506) is initially filled with oil. It has top openings (512) and a bottom collector (514). Upstream of the top openings is a manifold of tubes connected to a packed column or tube. A pump is connected upstream to the bottom collector (514) and a gas source is connected upstream to the pump and downstream to the packed column (516). The process is initiated by the introduction of an oil-saturated surfactant upstream of the pump. It is pumped toward the gas source and through the packed column or tube for foaming, and released to the top opening of the tank through a manifold of tubes. The foamed surfactant remains on the top of the oil surface until it eventually collapses and makes its way down to the bottom collector, which is upstream to the pump. The collapsed and settled surfactant is now pumped out for re-foaming and the cycle is repeated.

Any used or spent aqueous surfactant solution obtained from other oil recovery operations is oil-saturated. Therefore, even the subsequent VOC loss from oil just recovered from any oil or bitumen sources using the multifunctional multipolymeric surfactant can be prevented by using the very surfactant that was employed to recover the oil. The proximity of the newly recovered oil to the spent surfactant can be taken advantage of to further implement a continuous VOC loss control system "in situ."

Where recyclability is not an issue from the economic, space, and convenience standpoints, a separate source of foamed surfactant can be attached to the top of the tank and continually or periodically provide replenishment or replacement of settled/spent surfactant. The settled surfactant solution can be removed from the bottom by, for example, controlled pumping out; providing a release valve; providing a bottom opening; and letting gravitational forces release the settled surfactant solution.

Since the multifunctional, multipolymeric surfactant can be designed to remove sulfur from the oil, this operation can also result in the gradual reduction in sulfur content of the oil while it is in storage.

While the examples presented above contain specificities, these should not be construed as limiting the scope of the invention. They merely serve as illustrations of the use of the preferred multifunctional, multipolymeric surfactant. Other multifunctional multipolymeric surfactants described in the specifications can also be used for the same purposes. One skilled in the art will recognize from the disclosure how surfactants can be customized to include components that impart desired functionalities in order to enhance performance. For enhanced oil recovery applications, for example, a demulsifying function built into the surfactant itself becomes very valuable. The inventor has adequately disclosed how to impart these and other desired functionalities into various surfactant molecules; thus, they can aptly be called multifunctional, multipolymeric surfactants.

The following is a list of the references cited in this document:

Arnaud, Johnny; U.S. Pat. No. 6,875,351, Apr. 5, 2005.
Ashrawi, Samir S.; U.S. Pat. No. 5,282,984, Feb. 1, 1994.
Balzer, Dieter, U.S. Pat. No. 4,842,067.
Berger. Paul D.; U.S. Patent Application 20050199395, Filed Mar. 10, 2004.
Bird, R. B.; Stewart, W. E.; Lightfoot, E. N.; "Transport Phenomena", John Wiley and Sons, New York, 1960.
Borchardt, John K.; Bright, D. B.; Dickson, M. K.; Wellington, S. L.; "Surfactants for Carbon Dioxide Flooding Effects of Surfactant Chemical Structure on One Atmosphere Foaming Properties", in: Surfactant-Based Mobility Control—Progress in Miscible Flood Enhanced Oil Recovery, Duane H. Smith (Ed.), ACS Symposium Series, Volume 373, American Chemical Society, Washington, D.C., 1988.
Bouck, Larry S.; U.S. Pat. No. 4,412,585, Nov. 1, 1983.
Boudreau, Edward. L.; U.S. Pat. No. 6,776,234, Aug. 17, 2004.
Boudreau, Edward. L.; U.S. Patent Application 20040224854, Filed Jun. 9, 2004.
Brooks, B. W.; "Free-Radical Polymerization: Suspension", in: Handbook of Polymer Reaction Engineering, Thierry Meyer and Jos Keurentjes (Eds.), Wiley-VCH, Weinheim, 2005.
Caneba, Gerard T.; U.S. Pat. No. 5,173,551, Dec. 22, 1992.
Caneba, Gerard T.; Axland, Jay; Journal of Minerals and Materials Characterization and Engineering, Volume 1, No. 2, (2002) pp. 97-109.
Caneba, Gerard T.; Dar, Yadunandan; "Free-Radical Retrograde-Precipitation Copolymers and Process of making the Same", U.S. patent application Ser. No. 10/045,725, and Divisional patent application Ser. No. 11/181,481, filed on Jul. 14, 2005.
Catla, Jeffrey S.; U.S. Pat. No. 5,746,909, May 5, 1998.
Chen, Catherine S. H.; Williams, Albert L; U.S. Pat. No. 4,577,000, Mar. 18, 1986.
Cooke, Thomas W.; U.S. Pat. No. 4,460,791, Jul. 17, 1984.
Dardis, Richard E.; U.S. Pat. No. 4,509,597, Apr. 9, 1985.
Deng, Shubo; Yu, Gang; Jiang, Zhanpeng; Zhang, Ruiquan; Ting, Yen Peng; Colloids and Surfaces A: Physicochem. Eng. Aspects, 252 (2004) 113-119.
Djabbarah, Nizar F; Garling, Ralph, V.; Hand, David, T.; Macfadyen, Jennifer; U.S. Pat. No. 5,542,474, Aug. 6, 1996.
Evani, Syamalarao; U.S. Pat. No. 4,184,096, Mar. 21, 1989.
Farmer III, Robert; Lawson, Jimmie B.; Sawyer Jr., Webster, M.; U.S. Pat. No. 3,943,160, Mar. 9, 1976.
Fried, Joel R.; "Polymer Science and Technology", Prentice-Hall, Englewood Cliffs, N.J., 1995, ISBN 0-13-685561-X, p. 134.
Gale, Walter W.; Ashcraft Jr., Thomas L.; Saunders, Rhoderick K.; U.S. Pat. No. 3,946,812, Mar. 30, 1976.
Georges, Michael K.; Veregin, Richard N.; Kazmaier, Peter M.; Hamer, Gordon K.; Macromolecules, Vol. 26 (1993), pp. 2987-2988.
Graham, Robert J.; Helstrom, John J.; Peck, Lawrence B.; Stone, Richard A.; U.S. Pat. No. 4,722,782, Feb. 2, 1988.
Graham, Robert J.; Helstrom, John J.; Peck, Lawrence B.; Stone, Richard A.; Bernier Jr., Edward J.; U.S. Pat. No. 5,143,598, Sep. 1, 1992.
Gregoli, Armand A.; Hamshar $3^{rd}$, John A.; Rimmer, Daniel P.; Yildirim, Erdal; Olah, Andrew M.; U.S. Pat. No. 5,340,467, Aug. 23, 1994.
Gupta, Surendra P.; U.S. Pat. No. 4,467,869, Aug. 28, 1984.
Guymon, E. Park; U.S. Pat. No. 5,252,138, Oct. 12, 1993.
Hanse, C. M., "Hansen Solubility Parameter", CRC Press, 1999.
Hardin, Dukecal J.; U.S. Pat. No. 4,110,195, Aug. 29, 1978.
Hsu, Oliver Y. S.; Hsu, Nelson S. N.; U.S. Pat. No. 6,022,834, Feb. 8, 2000.
Isaacs, Erza E.; Prowse, Daniel R.; U.S. Pat. No. 4,458,759, Jul. 10, 1984.
Keoshkerian, Barkev; Georges, Michael K.; Boils-Boissier, Danielle; Macromolecules, Vol. 28 (1995), pp. 6381-6382.
Kroschwitz, J. L.; Ed., "Concise Encyclopedia of Polymer Science and Engineering", 1990, John Wiley and Sons, New York, pp. 1233-1236.
Kuphal, Jeffrey A.; Robeson, Lloyd M.; Sagl, Dennis; U.S. Pat. No. 5,171,777, Dec. 15, 1992.
La Mantia, Francesco Paolo, "Degradation of Polymer Blends", in: Handbook of Polymer Degradation, S. Halim Hamid, Mohamed B. Amin, and Ali G. Maadhah (Eds.), Marcel Dekker, Inc., New York, 1992.
Lebreton, Pierre; Ameduri, Bruno; Boutevin, Bernard; Corpart, Jean-Marc; Macromolecular Chemistry and Physics, Volume 203, No. 3, (2002), pp. 522-537.
Matyjasewski, Krzysztof; Coca, Simion; Gaynor, Scott G.; Greszta, Dorota; Patten, Timothy E.; Wang, Jin-Shan; Xia, Jianhui; U.S. Pat. No. 5,807,937, Sep. 15, 1998.
Merchant Jr., Philip; Smith Jr., Dean L.; U.S. Pat. No. 4,407,707, Oct. 4, 1983.
Miller, Jan D.; Hupka, Jan; U.S. Pat. No. 4,470,899, Sep. 11, 1984.
Mitchell, David S.; U.S. Pat. No. 4,410,551, Aug. 30, 1983.
Mohanty, K. K. and Caneba, "Enhanced Oil Recovery—A Review", *Encyclopedia of Chemical Processing*, Dekker Encyclopedias, November, 2005.
Moss, David Kelly; U.S. Pat. No. 7,125,825, Oct. 24, 2006.
Needham, Riley B.; U.S. Pat. No. 4,068,717, Jan. 17, 1978.
Newcombe, Jack; U.S. Pat. No. 4,216,079.

Odell, P. G.; Veregin, P. N.; Michalak, L. M.; Brousmiche, D.; Georges, M. K.; Macromolecules, Vol. 28 (1995), pp. 8453-8455.
Odian, George; "Principles of Polymerization", 2nd Edition, John Wiley and Sons, New York, 1981.
Olah, Andrew M.; U.S. Pat. No. 5,000,872, Mar. 19, 1991.
Pathak, Prabodh; Salter, Stephen J.; Gonzales, Jay A.; Perkins, Thomas K.; U.S. Pat. No. 4,657,059, Aug. 18, 1987.
Pope, Gary A.; Baviere, Marc; "Reduction of Capillary Forces by Surfactants", in: Basic Concepts in Enhanced Oil Recovery Processes, M. Baviere (Ed.), Critical Reports on Applied Chemistry, Volume 33, Elsevier Applied Science, London and New York, 1991.
Presley C. Travis; Harrison, Rebecca J.; 1642824 August, 1972 DE 252/330.
Prausnitz, J. M., Lichtenthaler, R., and de Azevedo, E., "Molecular Thermodynamics of Fluid-Phase Equilibria, Prentice-Hall, New Jersey, 1999.
Schramm, Laurier L.; Smith, Russell G.; U.S. Pat. No. 5,009,773, Apr. 23, 1991.
Siefkin, James M.; Boesiger, Dwight D.; U.S. Pat. No. 4,368,111, Jan. 11, 1983.
Sevigny, Williard J.; Kuehne, Donald L.; Cantor, Jeremy; U.S. Pat. No. 5,358,045, Oct. 25, 1994.
Shpakoff, Paul Gregory, and Raney, Kirk Herbert; "Method and composition for enhanced hydrocarbons recovery", U.S. Pat. No. 7,137,447, Nov. 21, 2006.
Shpakoff, Paul Gregory, and Raney, Kirk Herbert; "Method and composition for enhanced hydrocarbons recovery", U.S. Pat. No. 7,055,602, Jun. 6, 2006.
Snyder, Harold L.; Meakin, Paul; Reich, Shymon; Macomolecules, Volume 16 (1983), pp. 757-762
Stahl, G. A.; Seymour, R. B.; in: Structure-Solubility Relations in Polymers, Proc. Symp., Academic Press, New York, pp. 259-68, 1977.
Stahl, G. A.; Seymour, R. B.; J. of Macromolecular Science, Chemistry, A11(1), 53-64 (1977).
Stapp, Paul R.; U.S. Pat. No. 4,470,461, Sep. 11, 1984.
Stapp, Paul R.; Chaney, Mary B.; U.S. Pat. No. 4,490,263, Dec. 25, 1984.
Taylor, Alistair S.; U.S. Pat. No. 4,822,481, Apr. 18, 1989.
Thirumalachar, M. Jeersannidhi; Narasimhan Jr., M. Jeersannidhi; U.S. Pat. No. 4,929,341, May 29, 1990.
Van Den Berg, Franciscus Gondulfus Antonius; Jansen, Arte; and, Stamps, Paulus Antoon; U.S. Pat. No. 6,787,027, Sep. 7, 2004.
Wang, Demin; U.S. Pat. No. 6,439,308, Aug. 27, 2002.
Widmyer, Richard H.; U.S. Pat. No. 4,34,812, Jul. 12, 1977.
Xantos, M., Polymer Engineering and Science, Vol. 28, No. 21, 1988.
Yildirim, Erdal; U.S. Pat. No. 4,406,499, Sep. 27, 1983.

For the purposes of this disclosure, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

Therefore, the scope of the invention should be determined by the appended claims and their legal equivalents.

What is claimed is:

1. A method of recovering oil/bitumen from surface or sub-surface fossil-based material sources, or contaminations, the method comprising:
   (a) contacting the surface or sub-surface fossil-based material source or contamination with an aqueous fluid containing a continuous composition spectrum multifunctional polymeric surfactant mixture comprising at least a polymer surfactant and a thickener polymer, said surfactant mixture having a molecular weight greater than its entanglement molecular weight to provide a fluid mixture comprising petroleum hydrocarbons, wherein the polymer surfactant comprises a hydrophobic part and a hydrophilic part, the hydrophobic part comprising at least one non-aliphatic, non-aromatic functionality that imparts a dipole moment greater than 0 Debye to the hydrophobic part; and
   (b) separating an oil phase comprising petroleum hydrocarbons from the fluid mixture or allowing an oil phase comprising petroleum hydrocarbons to separate from the fluid mixture.

2. The method of claim 1, wherein contacting the surface or sub-surface oil source or contamination with the aqueous fluid comprises mixing the surface or sub-surface oil source or contamination with the aqueous fluid to provide the fluid mixture, the method further comprising:
   (c) separating a fluid phase comprising the polymer surfactant from the fluid mixture, or allowing a fluid phase comprising the polymer surfactant mixture to separate from the fluid mixture; and
   (d) separating a solid phase comprising solids from the surface or sub-surface oil source or contamination from the fluid mixture, or allowing a solid phase comprising solids from the surface or sub-surface oil source or contamination to separate from the fluid mixture.

3. The method of claim 2, wherein a top layer of the solid phase comprises heavy crude containing at least one metal, the method further comprising removing the top layer of the solid phase, extracting the heavy oil, and removing the metal from the extracted heavy oil.

4. The method of claim 3, wherein the metal is vanadium.

5. The method of claim 2, further comprising mixing the separated fluid phase with additional polymer surfactant mixture and using the mixture as the aqueous fluid in a subsequent petroleum hydrocarbon recovery step in accordance with the method of claim 2.

6. The method of claim 1, wherein contacting the surface or sub-surface oil source or contamination with the aqueous fluid comprises injecting a solution containing the aqueous fluid into the surface or sub-surface oil source or contamination to provide the fluid mixture, the method further comprising collecting the fluid mixture from the surface or sub-surface oil source or contamination prior to separating an oil phase comprising petroleum hydrocarbons from the fluid mixture.

7. The method of claim 1, wherein hydrophobic part of the polymer surfactant mixture has a Hansen's polar solubility parameter greater than 0 $(cal/cm^3)^{1/2}$.

8. The method of claim 1, wherein the polymer surfactant mixture has a number average molecular weight of at least about 5,900 Daltons, not including the molecular weight of any olefin segments.

9. The method of claim 1, wherein the petroleum hydrocarbons are recovered from a surface or subsurface oil source comprising tar sands or tar sand tailings.

10. The method of claim 1, wherein the petroleum hydrocarbons are recovered from a surface oil source or subsurface oil source selected from the group consisting of shale, asphalt, or industrial sludge.

11. The method of claim 1, wherein the petroleum hydrocarbons are recovered from a surface oil spill on soil.

12. The method of claim 1, wherein the polymer surfactant is a block multipolymer.

13. The method of claim 1, wherein the hydrophilic part of the polymer surfactant mixture comprises polymerized acrylic acid monomers and the hydrophobic part of the polymer surfactant comprises polymerized vinyl acetate monomers.

14. The method of claim 1, wherein the polymer surfactant mixture includes a tapered block copolymer of vinyl acetate and acrylic acid.

15. The method of claim 1, further comprising removing sulfur from the oil phase.

16. The method of claim 1, further comprising:
  c) injecting a series of slugs of aqueous solutions of the polymeric surfactant starting with slugs of lower viscosity, followed by slugs of higher viscosity or thickened aqueous surfactant solutions; and
  d) injecting slugs of water or materials other than polymeric surfactants between and/or after the slugs of polymeric surfactant.

17. The method of claim 1 wherein the polymer surfactant is a tapered block multipolymer.

18. A continuous composition spectrum multifunctional polymeric surfactant mixture comprising at least a polymer surfactant and a thickener polymer for oil/bitumen recovery wherein:
  a) the continuous composition multifunctional polymeric surfactant-thickener mixture has a molecular weight greater than its entanglement molecular weight;
  b) the continuous composition multifunctional polymeric surfactant-thickener mixture has a % of hydrophilic groups sufficient to be compatible with water;
  c) the continuous composition multifunctional polymeric surfactant-thickener mixture has a polar hydrophobic group; and
  d) the continuous multifunctional polymeric surfactant-thickener mixture comprises polymer molecules and wherein said polymer molecules are derived from a set of monomer molecules and wherein said set of monomer molecules are either the same or its own subset, and wherein said polymer molecules have different segmental distribution of monomers.

19. The surfactant mixture in claim 18 wherein the polymer surfactant is a block multipolymer.

20. The surfactant mixture in claim 18 wherein the polymer surfactant is a tapered block multipolymer.

* * * * *